(12) United States Patent
Selva, Jr. et al.

(10) Patent No.: US 7,186,198 B2
(45) Date of Patent: Mar. 6, 2007

(54) TRANSAXLE

(76) Inventors: Efrain A. Selva, Jr., 40425 Daily Rd., Fallbrook, CA (US) 92028; Paul R. Brock, 814 Cardamom Ct., Chula Vista, CA (US) 91910

( * ) Notice: Subject to any disclaimer, the term of this patent is extended or adjusted under 35 U.S.C. 154(b) by 94 days.

(21) Appl. No.: 11/065,887

(22) Filed: Feb. 24, 2005

(65) Prior Publication Data

US 2006/0189431 A1    Aug. 24, 2006

(51) Int. Cl.
*F16H 54/04* (2006.01)
(52) U.S. Cl. .................................... 475/159
(58) Field of Classification Search ........... 475/159, 475/160
See application file for complete search history.

(56) References Cited

U.S. PATENT DOCUMENTS 3,648,544 A * 3/1972 Tanaka .................. 475/71
4,899,622 A * 2/1990 Kobayashi ............... 475/160

* cited by examiner

*Primary Examiner*—Dirk Wright
(74) *Attorney, Agent, or Firm*—Fehr Law Firm; Thompson E. Fehr

(57) ABSTRACT

An improved transaxle having space along an input shaft so that transmission fluid can flow along such input shaft. The input shaft is splined to a forward drum. In order for transmission fluid to be able to pass the splines of the input shaft and the mating splines of the forward drum, either one or more splines or one or more mating splines are removed. Some of each may also be eliminated. The structural integrity of the input shaft is maintained by having the splines radiate from the surface of the input shaft. Optionally, a bushing and tubes facilitate the movement of transmission fluid from the surface of the input shaft, to a cooler, and back to the surface of the input shaft. Furthermore, a variety of construction techniques are employed for, inter alia, further strengthening the improved transaxle.

73 Claims, 12 Drawing Sheets

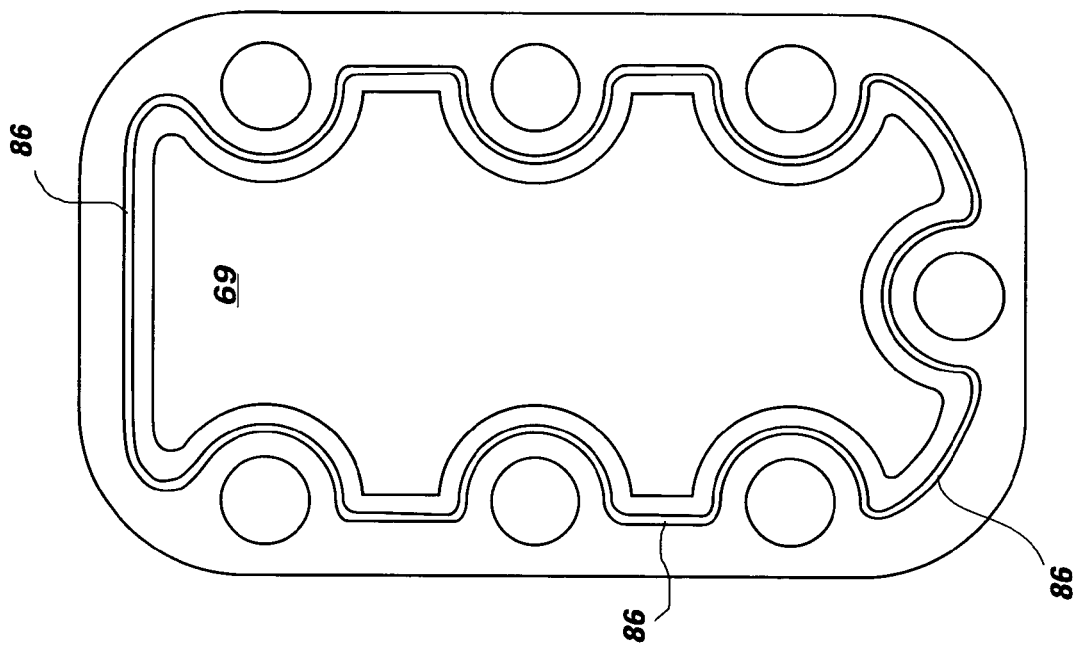
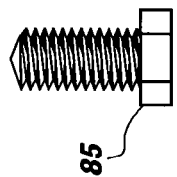
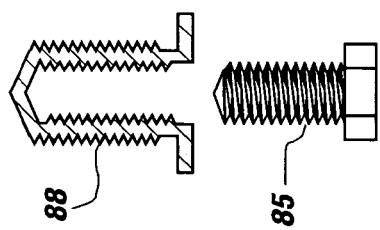
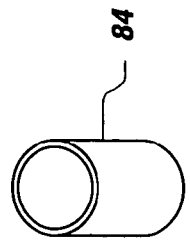
FIG. 11d
FIG. 11c
FIG. 11a
FIG. 11b

TRANSAXLE

BACKGROUND OF THE INVENTION

1. Field of the Invention

This invention relates to transaxles, especially a hydraulically operated semi-automatic planetary transaxle assembly.

2. Description of the Related Art

A semi-automatic transaxle comprises a differential section and a transmission section coupled to an engine with a torque converter. The transmission section contains hydraulically controlled clutches and bands. The transmission section includes a transmission fluid pump to create the requisite hydraulic pressure. This fluid pressure is regulated and directed, by a valve body assembly, to the clutches and bands in various combinations in order to provide several output gear ratios to the differential.

Numerous design features exist for transaxles.

The basic structure of a semi-automatic transaxle consists of an input shaft coming from a torque converter that is connected to the engine, an intermediate shaft, optional drop-down gears, an output or pinion shaft, a pinion gear, a ring gear, clutches, and bands.

In some transaxles, transmission fluid from the torque converter travels within a channel running longitudinally inside the input shaft to be used subsequently for lubrication. This is, however, not desirable because having the input shaft hollow structurally weakens the input shaft. In some other transaxles the transmission fluid travels along the surface of the input shaft before descending into a channel of the input shaft in order to travel further. Again this introduces structural weakness and is, therefore, undesirable.

Some transaxles place a transmission fluid pump on the front of the differential section of the transaxle, enabling the drop-down gears to be at the back of the transmission section of the transaxle.

In some transaxles, tapered roller bearings at the pinion gear and ring gear positions are provided with shims behind the bearing cups to allow more precise positioning.

The transmission fluid pump in some transaxles circulates transmission fluid to a cooler (such as a radiator or heat exchanger) in order to lower the temperature of transmission fluid coming from the torque converter, which is quite hot.

Billet 300M steel is utilized in the input shaft and the intermediate shaft of some transaxles in order to increase strength.

Clutch drums in some transaxles are machined from billet 300M steel in order to increase strength.

Hollow dowels are used in joining sections of some transaxles to provide precise centering and alignment.

For some transaxles, steel thread inserts line the cavity where a bolt is to be screwed into aluminum.

And in some transaxles, an oil pump provides oil to be sprayed on the ring and pinion gears as well as the drop-down gears in order to cool them. Such oil is collected in a reservoir below the transaxle and circulated through a cooler.

No transaxle is, however, known to the inventor which incorporates all of the preceding features other than the undesirable hollow input shaft.

And the only semi-automatic transaxle known by the inventor to be used in vehicles intended for off-road racing is an Audi transmission coupled with an after-market differential section designed for passenger cars having 150 to 200 horsepower.

In the Audi transaxle of FIGS. 1a and 1b, the input shaft 2 and the intermediate shaft 5 are hollow so that a smaller shaft 1 can pass through them to power the transmission fluid pump, which is located at the extreme rear of the transmission case. This hollow structure, as suggested above, weakens the input shaft 2 and the intermediate shaft 5, causing them to be prone to twisting and breaking.

Moreover, the flow of power in the Audi transaxle is, as depicted in FIG. 1b, rather complicated. As illustrated in FIG. 1b, the input shaft 2 goes through the differential section 3 to the transmission section 4 and proceeds inside the intermediate shaft 5. When the clutch 6 is engaged, the intermediate shaft 5 sends the power back toward the differential section 3 to the drop-down gears 7 to reach the output shaft 8 in the differential section 3.

Additionally, the Audi clutch drums are made of a cast material of limited strength; and the differential section, being an after-market unit designed to be compatible with the Audi transmission unit, is similarly of limited strength.

There is no provision in the Audi transaxle for adjustments to the location of ring gear and pinion gear in order to achieve a wear pattern that will yield long life and reliability. Nor does the Audi transaxle provide for cooling the differential gear oil.

And two final disadvantage of the Audi transaxle are (a) that it does not have alignment dowels where the differential section is attached to the transmission case (or section), creating a substantial possibility of misalignment that will affect reliability and (b) that the design of the Audi transaxle creates a tendency for gear oil and transmission fluid to mix.

BRIEF SUMMARY OF THE INVENTION

The present Improved Transaxle utilizes a unique spline design in order to enable transmission fluid coming from the torque converter to flow along the surface of the input shaft in order to be available for lubrication. This enables the input shaft to be solid, thereby increasing its strength and its resistance to twisting.

Additionally, all of the advantageous features discussed above are present in this Improved Transaxle, a selection of features which, to the inventor's best knowledge, has never been made before and which creates a transaxle uniquely suited to the rigors of off-road racing, especially in vehicles having engines with more than 600 horsepower.

BRIEF DESCRIPTION OF THE SEVERAL VIEWS OF THE DRAWING

FIG. 11*a* portrays a fastener and a steel thread insert used to line a cavity wherever a bolt is utilized, FIG. 11*b* illustrates the hollow dowels which provide precise centering and alignment of adjoining sections, FIG. 11*c* shows a bolt used as an example of an acceptable fastener, and FIG. 11*d* depicts an o-ring inside the gear cover utilized positively to assure sealing with respect to fluids.

DETAILED DESCRIPTION OF THE INVENTION

As illustrated in FIGS. 2, 3, 4, 5, 8, and 12 the Improved Transaxle comprises a differential section 3 and a transmission section 4.

Figure 1A:
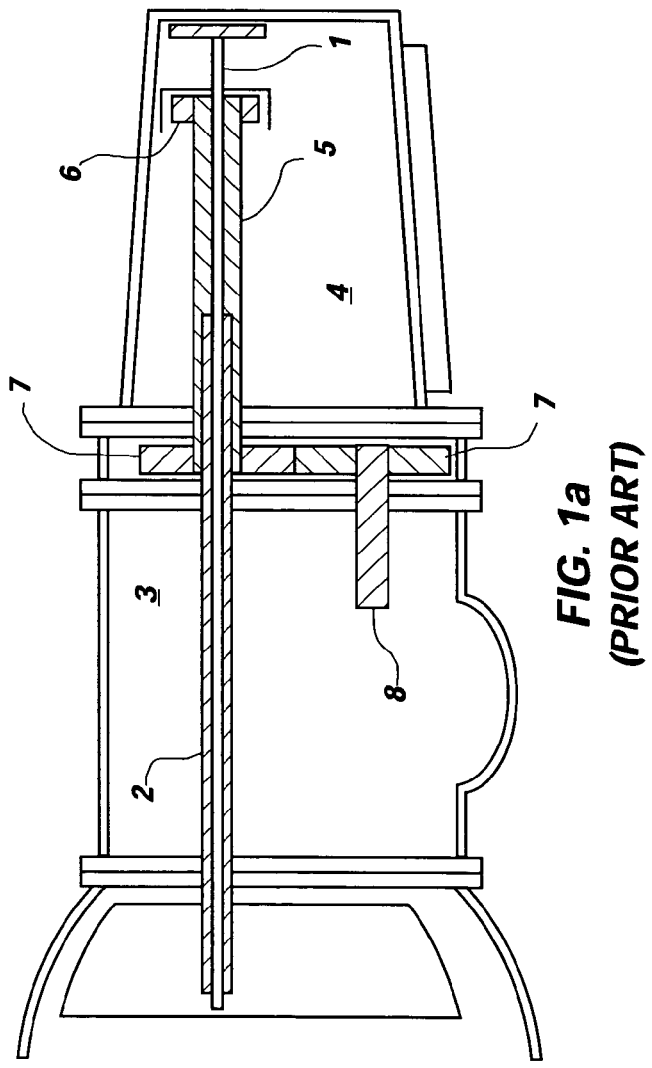
FIGS. 1a and 1b show the Audi transaxle of the prior art as well as the power flow therein.
Figure 1B:
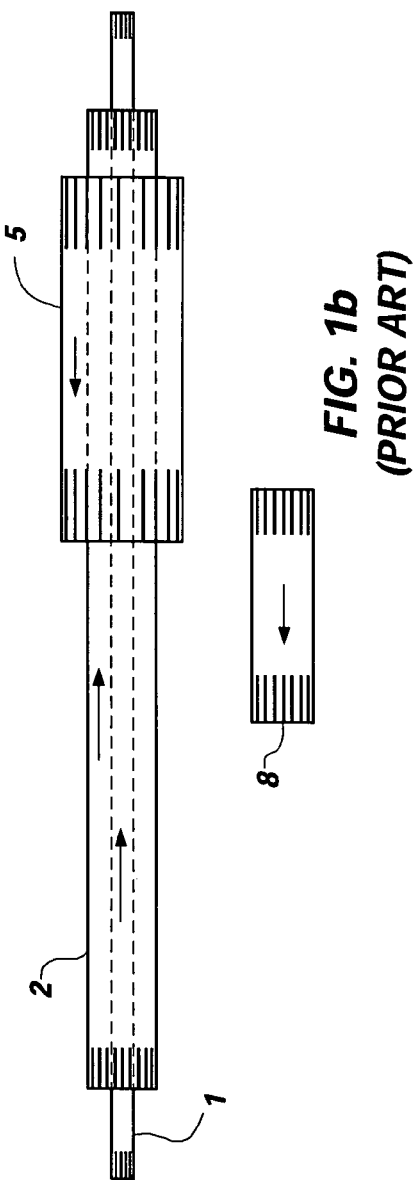
Figure 2:
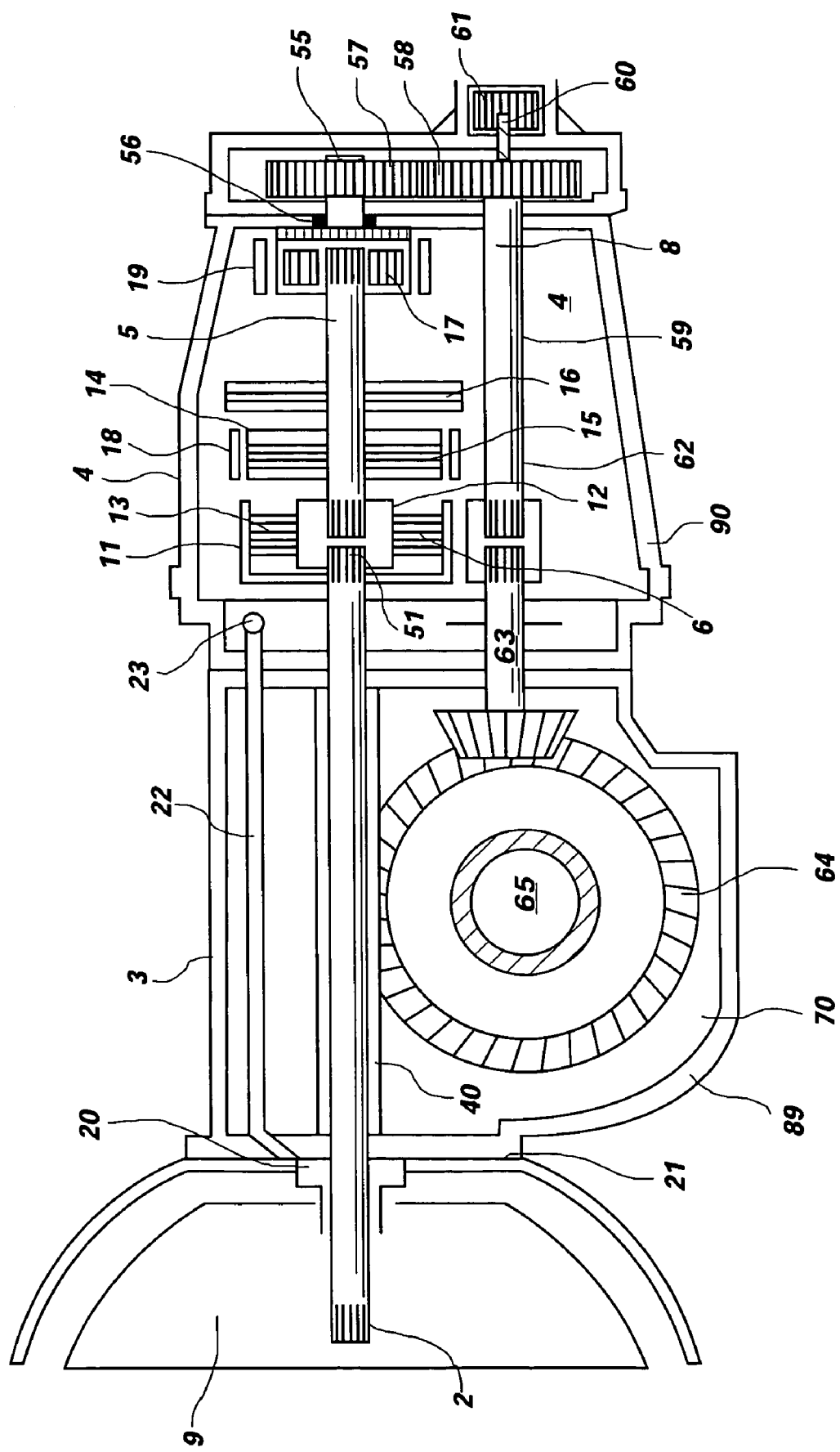
FIG. 2 demonstrates the overall Improved Transaxle, concentrating upon details of the differential section.

And, as shown in FIG. 2, an input shaft 2 comes from a torque converter 9 and has a transmission end 10 splined to a forward drum 11. An intermediate shaft 5 is splined to a forward hub 12 in the forward drum 11. The forward clutches 13 in the forward drum 11 lock the forward drum 11 and the forward hub 12.

Preferably, behind the forward drum 11 along the intermediate shaft 5 is a direct drum 14 which contains direct (third gear) clutches 15; and behind the direct drum 14 is a third set of (intermediate or second gear) clutches 16, which are not located inside a drum.

Traditional planetary gears 17 and bands 18, 19 are utilized within the transmission section 4 in order to provide the desired gear ratios, as illustrated in FIG. 2. The intermediate shaft 5, near the rear end 19 of such intermediate shaft 5 is connected to and powers the planetary gears 17.

As indicated above, the transmission fluid pump 20 is placed on the front 21 of the differential section 3 of the transaxle 1 and is driven by the torque converter 9.

Figure 3:
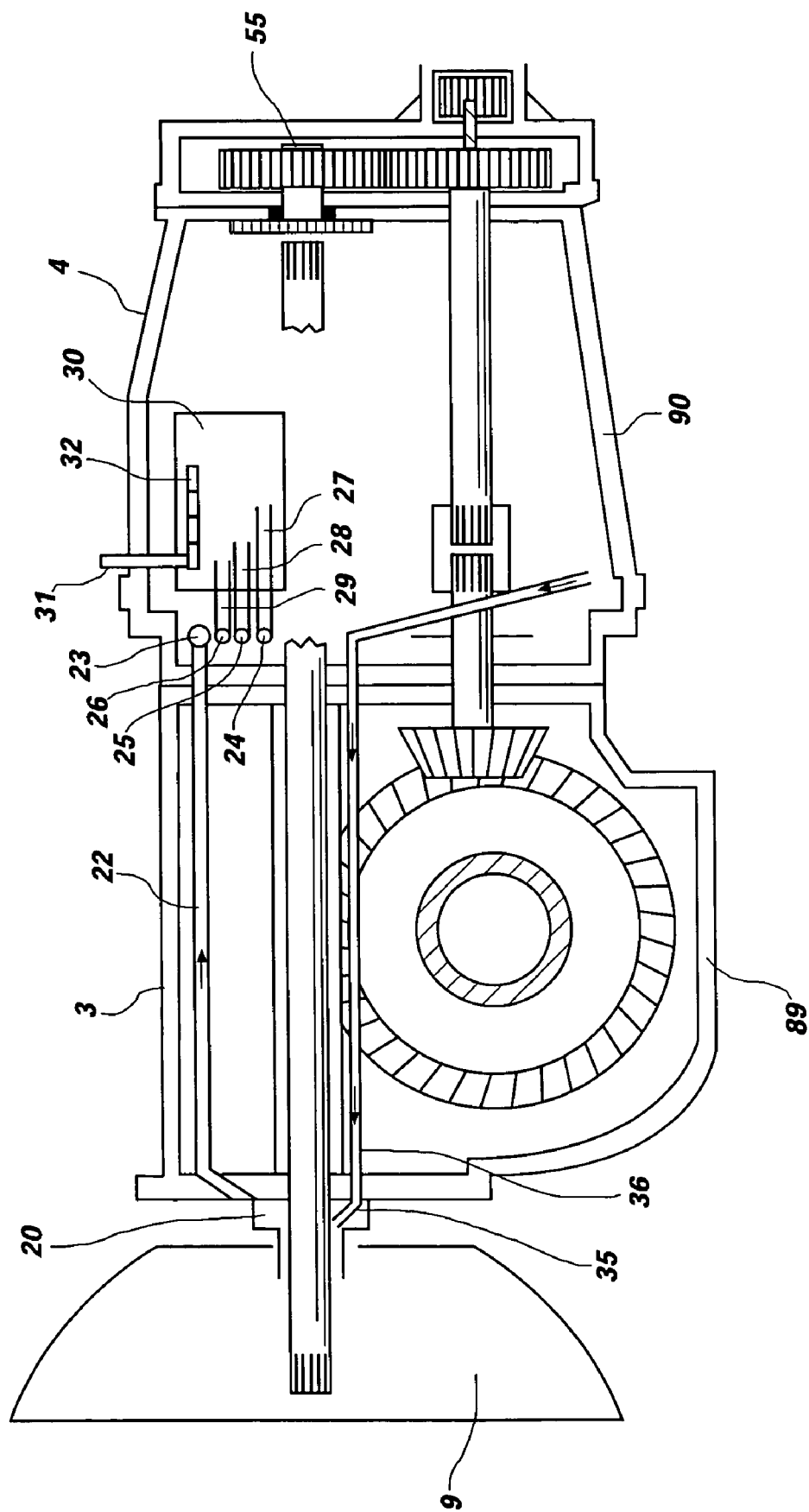
FIG. 3 primarily illustrates the structures utilized for the flow of transmission fluid within the Improved Transaxle.

The transmission fluid pump 20, depicted in FIG. 3, sends transmission fluid through a tube 22 to a pressure regulator 23. The pressure regulator 23 has three ports 24, 25, and 26 connected to channels 27, 28, 29, respectively, which respectively lead to a valve body 30, the torque converter 9, and the pressure side 35 of the transmission fluid pump 20 in order to release excess pressure.

Figure 4:
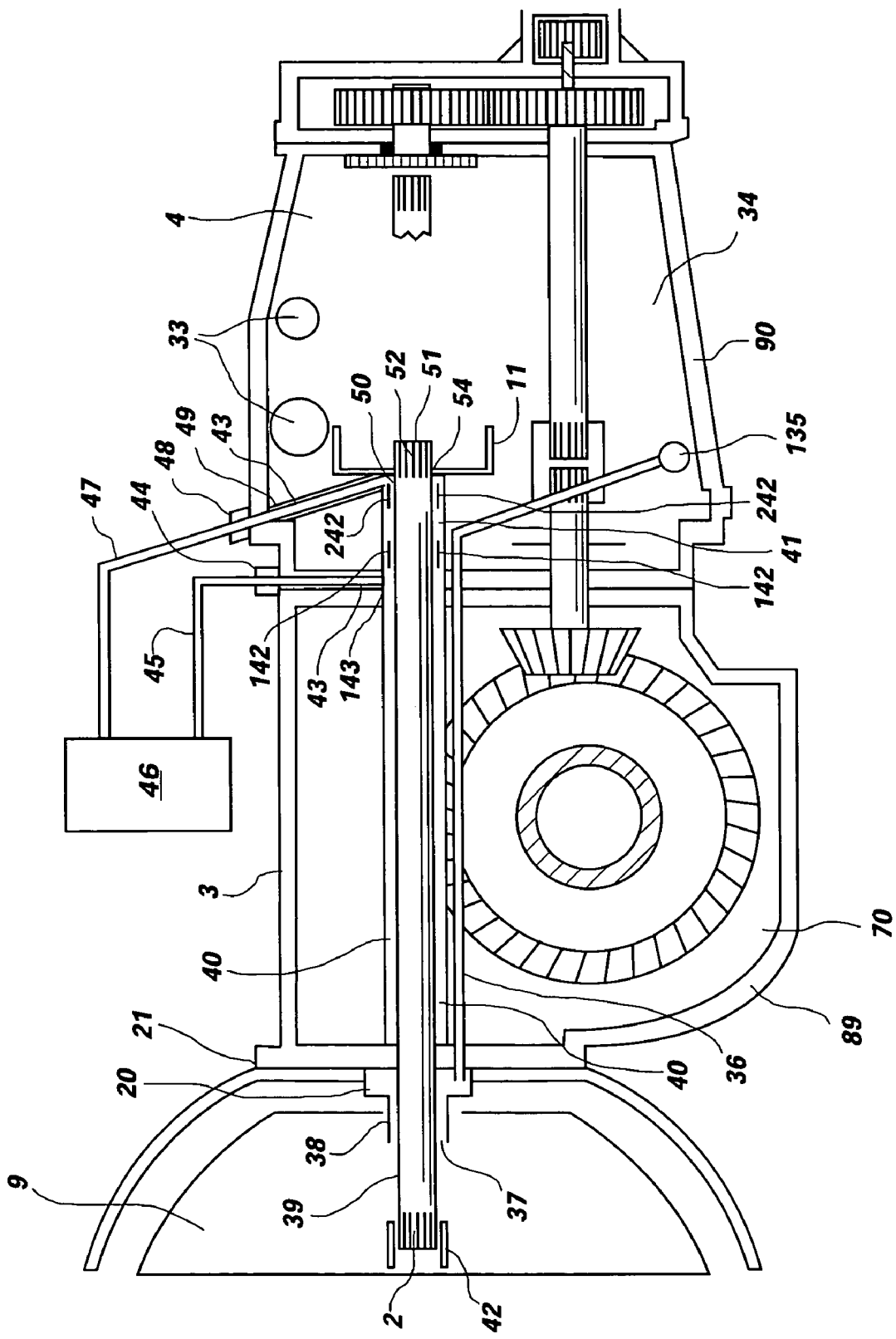
FIG. 4 emphasizes the structure of the input shaft and the pathway for transmission fluid along the surface of such input shaft.
Figure 5:
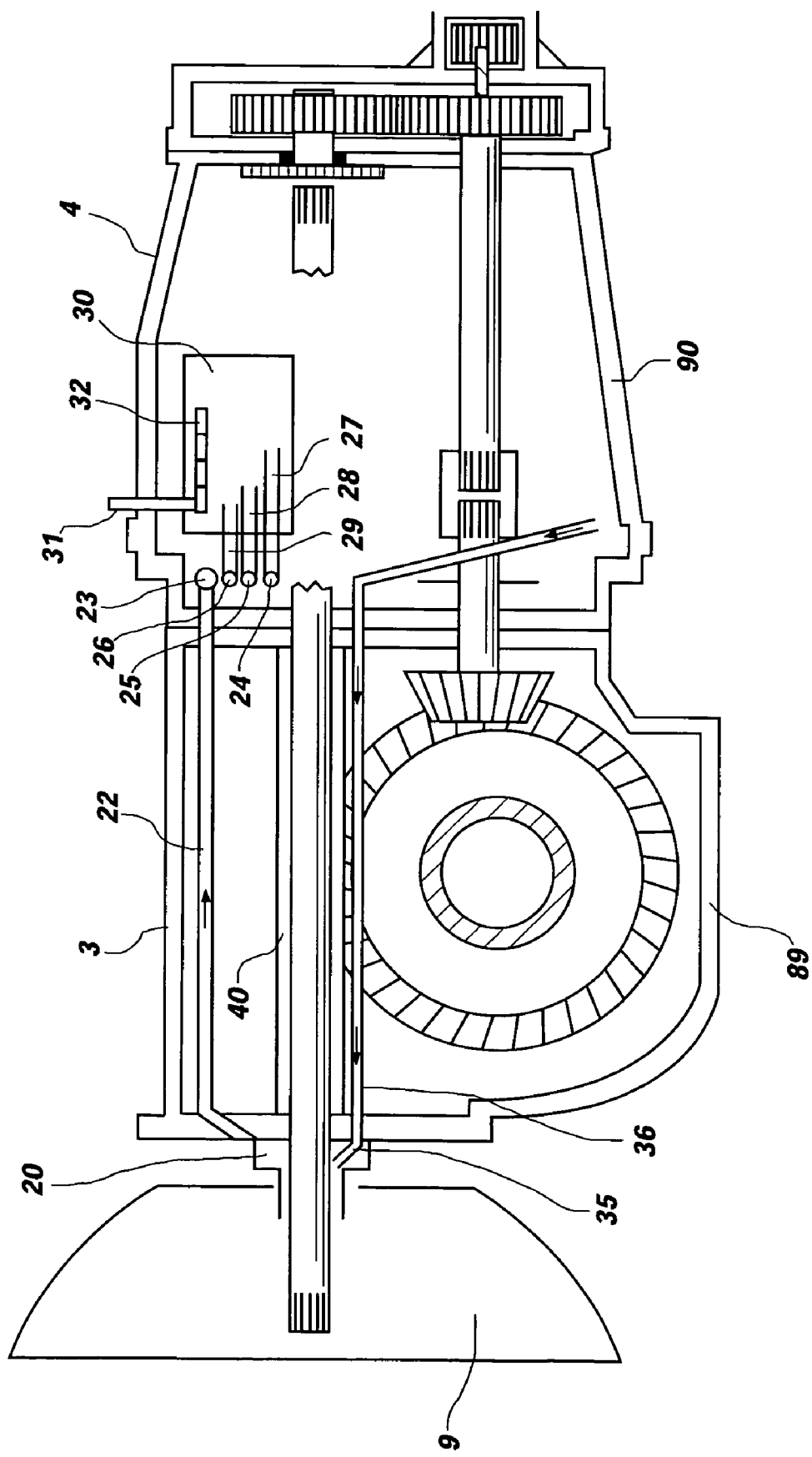
FIG. 5 shows the pathway for transmission fluid along the surface of the input shaft within the differential section and the transmission section of the Improved Transaxle.

As seen in FIG. 3, a shifter 31 opens and closes valves 32 in the valve body 30 to engage or disengage the various clutches 13, 15, and 16, shown in FIG. 2, and servos 33, portrayed in FIG. 4, in order to achieve the desired output gear ratios. After being used for this purpose, transmission fluid flows into a sump 34 at the bottom 135 of the transmission section 4. The transmission fluid pump 20 draws transmission fluid from the sump 34 through a tube 36, located in both the transmission section 4 and the differential section 3, into the transmission fluid pump 20.

A bushing 42 supports the input shaft 2 within the torque converter 9, and a space 37 is left between the input shaft 2 and the casing 38 of the torque converter 9 at least partially—and, preferably, completely—around the input shaft 2 so that the pressurized transmission fluid from the torque converter 9 flows from the torque converter 9 along the surface 39 of the input shaft 2 into the differential section 3.

And a space 40 exists between the input shaft 2 and the differential section 3 as does a space 41 between the input shaft 2 and the transmission section 4 in order to accommodate the flow of transmission fluid along the surface 39 of the input shaft 2 through the differential section 3 and into the transmission section 4.

Since the transmission fluid from the torque converter 9 flowing along the surface 39 of the input shaft 2 tends to be quite hot, a bushing 142 is, as shown in FIG. 4, preferably placed around the input shaft 2 to force such transmission fluid from a first side 143 of the bushing 42 into a channel 43. A fitting 44 connects a tube 45 to the channel 43. The tube 45 carries the transmission fluid to a cooler 46 (such as a radiator or a heat exchanger). Another tube 47, fitting 48, and channel 49 return the transmission fluid to the surface 39 of the input shaft 2 on a second side 50 of the bushing 142 or of a second bushing 242 when additional structural support is desired.

Figure 6:
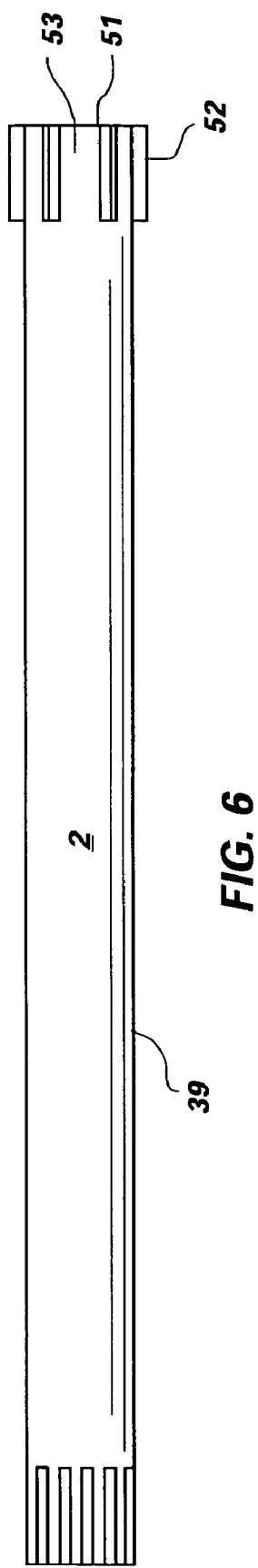
FIG. 6 is a lateral view showing the splines on the ends of the input shaft.
Figure 7B:
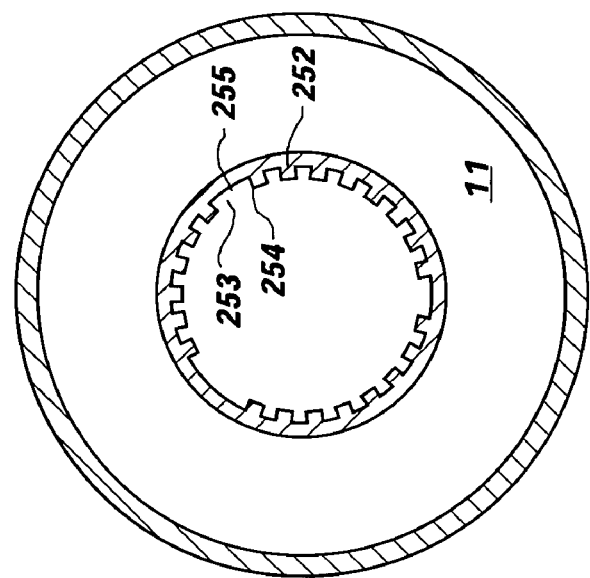
FIGS. 7a and 7b provide end views showing the splines on the transmission end of the input shaft and on the forward hub in the forward drum.
Figure 7A:
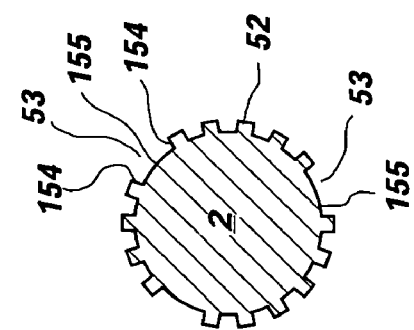

Near, and preferably at, the transmission end 51 of the input shaft 2 splines 52 radiate outward, as seen in FIGS. 6, 7*a*, and 7*b* in order to connect the transmission end 51 of the input shaft 2 to the forward drum 11. At least one, and preferably three, positions 53 which would otherwise be occupied by splines 52 are, however, left empty in order to provide for the passage of transmission fluid. The transmission fluid proceeds through the open position or positions 53, to the center 54 of the forward drum 11. In order to maintain the strength of the input shaft 2, such input shaft 2 has preferably its outer diameter increased so that the spaces 53 between adjacent splines 53 have a bottom 155 that is no deeper than the surface 39 of the input shaft 2 where there are no splines 52. Most preferably, the mating splines 252 on the forward drum 11 adjacent to the position 53 where a spline 52 has been eliminated have the sides 254 of such mating splines 252 adjacent to the position 253 that would have been occupied by the eliminated spline 52 of the input shaft 2 trimmed or otherwise narrowed in order to provide for greater flow of transmission fluid. Optionally but not preferably, the bottom 255 of the position 253 that would have been occupied by the eliminated spline 52 of the input shaft 2 may be lowered to facilitate the flow of transmission fluid. And an alternate to eliminating one or more splines 52 is the trimming described above, the lowering described above, or any combination of these techniques. Furthermore, the actions described in this paragraph, other than lowering (which would structurally weaken the input shaft 2), with respect to splines 52 and mating splines 252 can be reversed, e.g., one or more mating splines 252 can be eliminated on the forward drum 11 and trimming can be done on the sides 154 of the splines 52. Also, one or more splines 52 can be removed; and one or more mating splines 252 can also be removed as long as enough splines 52 and mating splines 252 remain adequately to connect the input shaft 2 and the forward hub 12.

Transmission fluid used for lubrication does not have to be returned to the transmission fluid pump 20.

The upper output shaft 55 proceeds from its attachment to the planetary gears 17, preferably through a seal 56, to connect co-axially with the upper drop-down gear 57. The upper drop-down gear 57 rotates against the lower drop-down gear 58. And the lower drop-down gear 58 is co-axially attached to the pinion shaft 59, a small portion 60 of which proceeds rearwardly to drive an oil pump 61 and the principal portion 62 of which goes forward to drive the pinion gear 63 which, in turn, moves the ring gear 64 and, ultimately, the axle drive flanges 65. Locating the drop-down gears 57, 58 at the rear of the Improved Transaxle facilitates quickly changing the final drive gear ratio, which is not possible in most transaxle units.

Figure 8A:
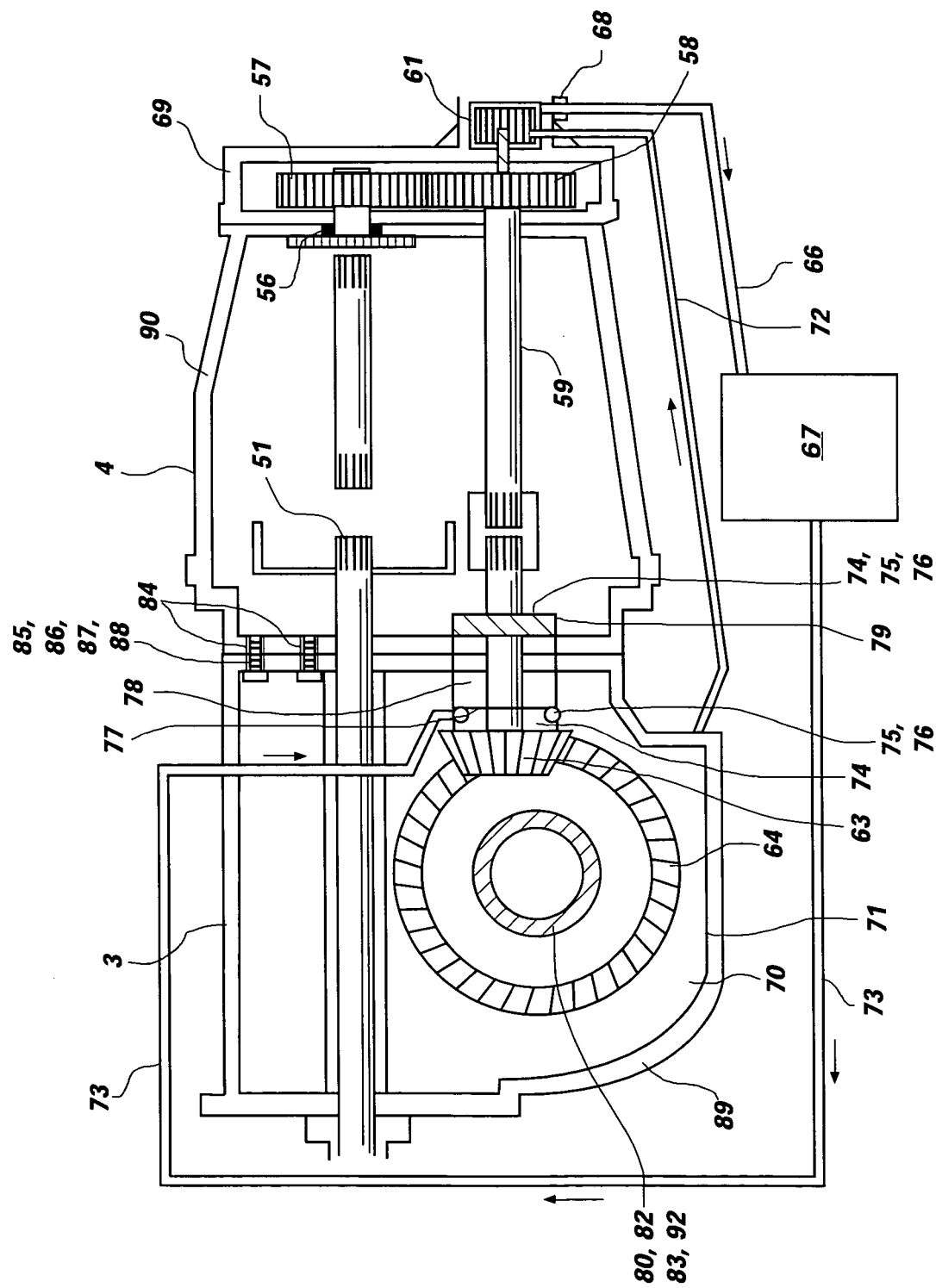
FIGS. 8*a* and 8*b* show the structure for spraying oil on the ring and pinion gears and, optionally, the drop-down gears.
Figure 9:
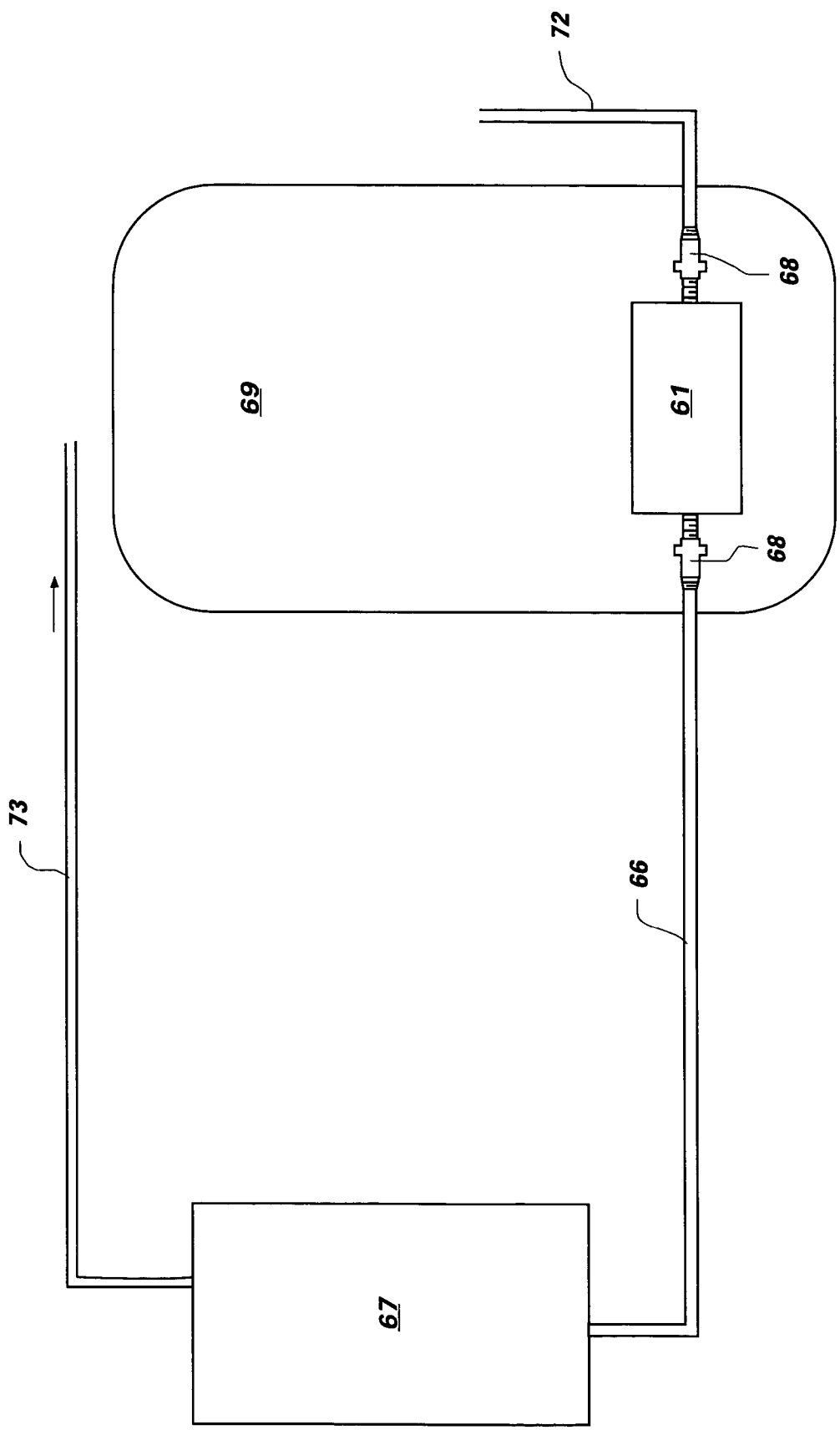
FIG. 9 illustrates the gear cover for the drop-down gear.

Similarly, preferably oil is forced, preferably utilizing a fitting 68 in the gear cover 69 (for the drop-down gears 57, 58), portrayed in FIG. 9, from the oil pump 61, through external tubes 66 and 73 to the differential section 3 in order in order to spray oil on the pinion gear 63 and the ring gear 64 to lubricate and cool them, as illustrated in FIG. 8*a*.

Figure 8B:
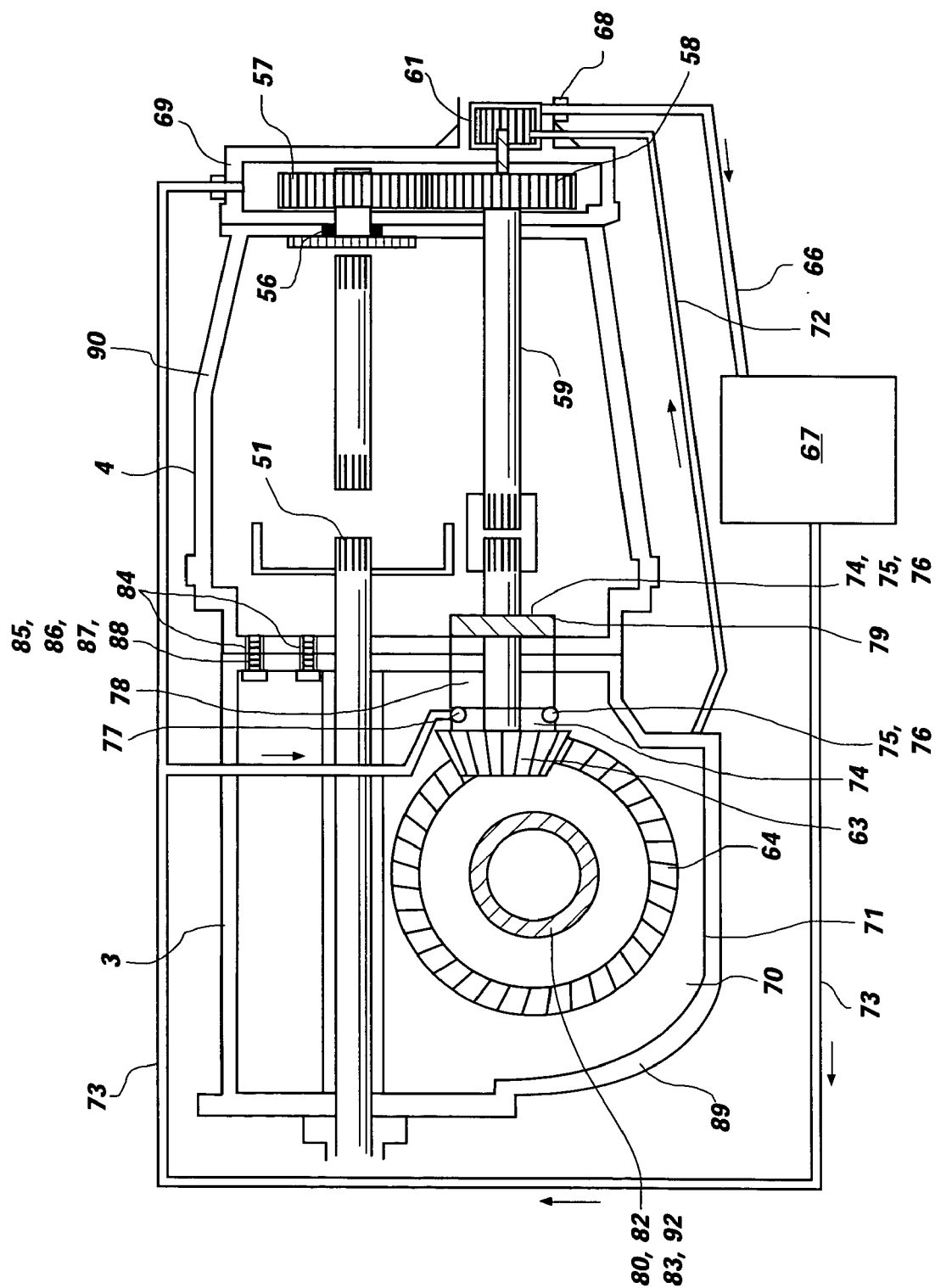

And as depicted in FIG. 8*b*, optionally the external tube 66 and the external tube 73 also take oil from the oil pump 61 to near the top of the drop-down gears 57, 58, in order to spray the oil on the drop-down gears 57, 58 to cool them.

After cooling the drop-down gears 57, 58 the oil so used is drained to the differential sump 70 near, and preferably, at the bottom 71 of the differential section 3. Oil used for cooling and lubricating the pinion gear 63 and the ring gear 64 also collects in the differential sump 70. A suction tube 72 returns oil from the differential sump 70 to the oil pump 61, preferably through a fitting 168 in the gear cover 69. Also preferably, a cooler 67 (such as a radiator or a heat exchanger) is placed between tube 73 and tube 66. (If there is no cooler 67, then tube 66 and tube 73 constitute a single tube.

The seal 56 prevents oil used for lubrication from mixing with gear oil.

Figure 10A:
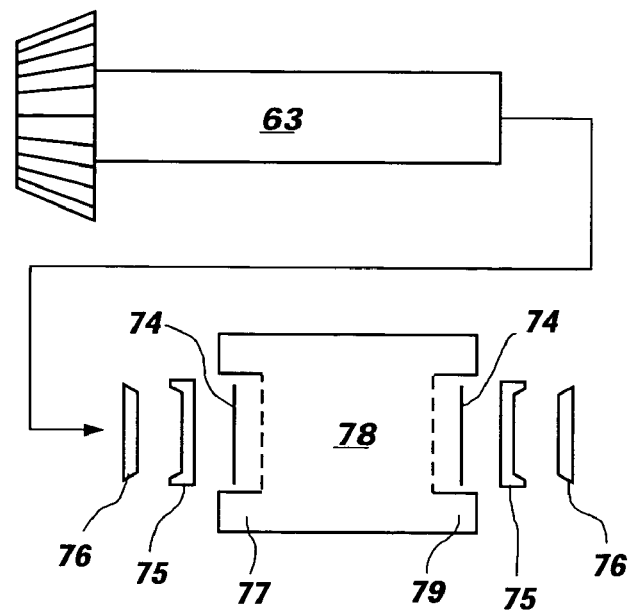
FIGS. 10*a* and 10*b* depict the placement of shims on the sides of the bearing cups for the tapered roller bearings of the pinion gear and ring gear.
Figure 10B:
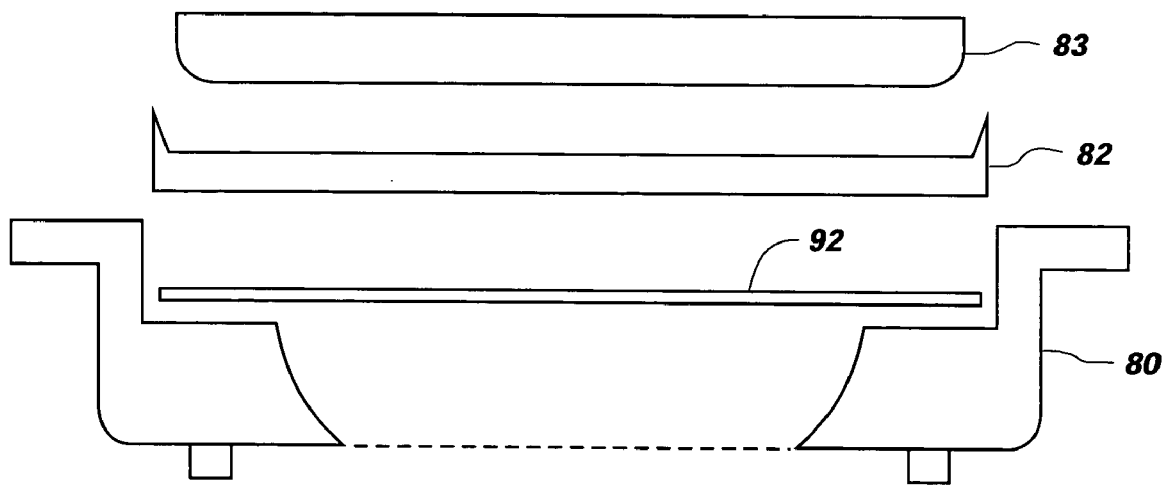

Placing, as portrayed in FIG. 10*a*, one or more shims 74 behind a first cup race 75 for a tapered roller bearing 76 adjacent to the front end 77 of the pinion carrier 8 which holds t the pinion gear 63 enables such pinion gear 63 to be more precisely longitudinally aligned with the ring gear 64. Alternatively or additionally, for this same purpose, one or more shims 74 are placed behind a cup race 75 for a tapered roller bearing 76 adjacent to the rear end 79 of the pinion carrier 78. And one or more flat shims 92 are placed adjacent to a side cover 80 behind a race 82 that holds the tapered roller bearings 83 for the ring gear 64, as shown in FIG. 10*b*, on a first side of the ring gear 64 in order to provide more precise transverse adjustment between the ring gear 64 and the pinion gear 63. Such flat shims 79 are available in various thicknesses, increasing in gradations of 0.002 inches. Alternatively or additionally, one or more flat shims 79 are, for the same purpose, placed adjacent to a side cover 80 behind a race 82 that holds the tapered roller bearing 83 for the ring gear 64, as depicted in FIG. 10*b*, on the opposite side of the ring gear 64.

Figure 12:
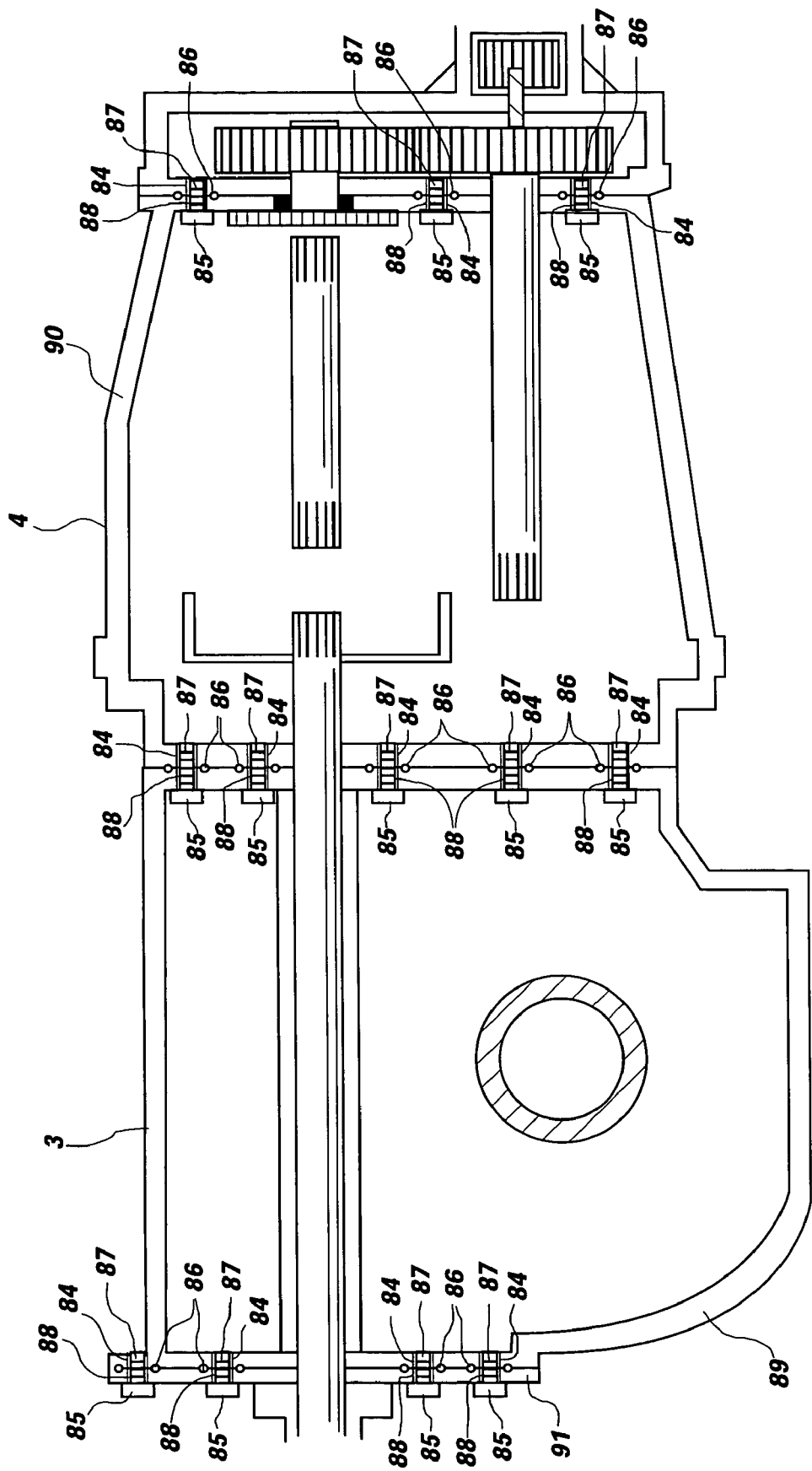
FIG. 12 depicts some of the locations where fasteners, steel thread inserts, hollow dowels, and o-rings are utilized in joining sections of the Improved Transaxle and connecting the gear cover to the transmission section.

In order to add further durability and reliability, the input shaft 2 and the intermediate shaft 5 are preferably constructed from billet 300M steel for strength; the forward drum 11 is preferably composed of billet 300M steel to prevent cracking; four hollow dowels 84 are preferably utilized, as shown in FIG. 11, to assure precise centering and alignment of four fasteners 85 that join the bell housing 91 to the differential section 3, four fasteners 85 that join the differential section 3 to the transmission section 4, and four fasteners 85 that join the gear cover 69 to the transmission section 4; o-rings 86 are preferably used in conjunction with each fastener 85 that joins the transmission section 4 to the differential section 3, and in conjunction with the attachment of the gear cover 69 to the transmission section, in order to preclude leaks; and wherever bolts 85 screw into aluminum, the requisite cavity 87 is lined with a steel thread insert 88 for increased strength, as illustrated in FIG. 12. In the Improved Transaxle, the case 89 for the differential section 3 is preferably constructed from aluminum; and the case 90 for the transmission section 4 is preferably constructed from aluminum.

In many situations with respect to the present invention, it will be apparent to one of ordinary skill in the art that a channel and a tube are interchangeable.

As used herein, the term "preferable" or "preferably" means that a specified element or technique is more acceptable than another but not that such specified element or technique is a necessity.

We claim:

1. An improved transaxle of the type having a differential section with a front, a transmission section, an input shaft with a surface and with a transmission end having splines with sides, a forward drum having mating splines with sides and being splined to the input shaft, a forward hub in the forward drum, an intermediate shaft splined to the forward hub, planetary gears connected to the intermediate shaft, an output shaft attached to the planetary gears, a pinion shaft attached to the output shaft, a pinion gear connected to the pinion shaft, and a ring gear powered by the pinion shaft with such ring hear having a first side and an opposite side, wherein the improvement comprises:

the differential section having a space between the differential section and the input shaft;

the transmission section having a space between the transmission section and the input shaft;

the splines radiating outward from the transmission end of the input shaft beginning at the distance of the outer diameter of the remainder of the input shaft; and at least one position for a spline on the transmission end of the input shaft being left without a spline.

2. The improved transaxle as recited in claim 1, further comprising:

a bushing around the input shaft;

a channel on a first side of the bushing;

a tube connected to, and in fluid communication with, said channel;

a cooler attached to, and in fluid communication with, said tube;

another tube connected to, and in fluid communication with said cooler; and another channel connected to, and in fluid communication with said other tube, proceeding near to the surface of the input shaft.

3. The improved transaxle as recited in claim 2, further comprising:

a transmission fluid pump on the front of the differential section;

a pinion carrier having a front end and a rear end;

a cup race for a tapered roller bearing near the front end of said pinion carrier;

a tapered roller bearing in said cup race;

one or more shims placed behind said cup race and adjacent to the front end of said pinion carrier;

another cup race for a tapered roller bearing near the rear end of said pinion carrier;

another tapered roller bearing, said other tapered roller bearing being in said cup race;

a side cover for a first side of the ring gear;

a race for holding a tapered roller bearing for the ring gear on the first side of the ring gear;

a tapered roller bearing for the ring gear located in said race;

one or more flat shims placed adjacent to said side cover behind said race;

another side cover, said other side cover being for the side of the ring gear opposite to the first side of the ring gear;

another race for holding a tapered roller bearing for the ring gear on the opposite side of the ring gear;

another tapered roller bearing, said other tapered roller bearing being located in said other race;
fasteners for connecting the differential section and the transmission section;
other fasteners for connecting a gear cover to the transmission section;
hollow dowels used with the fasteners and other fasteners; and
steel thread inserts used with the fasteners and other fasteners; and wherein:
the input shaft is constructed of billet 300M steel;
the intermediate shaft is constructed of billet 300M steel; and
the forward drum is constructed of billet 300M steel.

4. The improved transaxle as recited in claim 1, wherein the output shaft comprises:
an upper output shaft attached to the planetary gears;
an upper drop-down gear connected to said upper output shaft;
a lower drop-down gear rotated by said upper drop-down gear, said lower drop-down gear being attached to the pinion shaft.

5. The improved transaxle as recited in claim 4, further comprising:
a bushing around the input shaft;
a channel on a first side of the bushing;
a tube connected to, and in fluid communication with, said channel;
a cooler attached to, and in fluid communication with, said tube;
another tube connected to, and in fluid communication with said cooler; and
another channel connected to, and in fluid communication with said other tube, proceeding near to the surface of the input shaft.

6. The improved transaxle as recited in claim 5, further comprising:
a transmission fluid pump on the front of the differential section;
a pinion carrier having a front end and a rear end;
a cup race for a tapered roller bearing near the front end of said pinion carrier;
a tapered roller bearing in said cup race;
one or more shims placed behind said cup race and adjacent to the front end of said pinion carrier;
another cup race for a tapered roller bearing near the rear end of said pinion carrier;
another tapered roller bearing, said other tapered roller bearing being in said cup race;
a side cover for a first side of the ring gear;
a race for holding a tapered roller bearing for the ring gear on the first side of the ring gear;
a tapered roller bearing for the ring gear located in said race;
one or more flat shims placed adjacent to said side cover behind said race;
another side cover, said other side cover being for the side of the ring gear opposite to the first side of the ring gear;
another race for holding a tapered roller bearing for the ring gear on the opposite side of the ring gear;
another tapered roller bearing, said other tapered roller bearing being located in said other race;
an oil pump driven by the pinion gear; and
a means for conveying oil from said oil pump to the pinion gear and the ring gear;
fasteners for connecting the differential section and the transmission section;
other fasteners for connecting a gear cover to the transmission section;
hollow dowels used with the fasteners and other fasteners; and
steel thread inserts used with the fasteners and other fasteners; and wherein:
the input shaft is constructed of billet 300M steel;
the intermediate shaft is constructed of billet 300M steel; and
the forward drum is constructed of billet 300M steel.

7. The improved transaxle as recited in claim 6, further comprising:
a means for spraying oil on said upper drop-down gear and on said lower drop-down gear.

8. The improved transaxle as recited in claim 1, wherein:
each mating spline on the forward drum adjacent to an empty position where a spline would otherwise have been is narrowed on a side adjacent to such empty position.

9. The improved transaxle as recited in claim 8, further comprising:
a bushing around the input shaft;
a channel on a first side of the bushing;
a tube connected to, and in fluid communication with, said channel;
a cooler attached to, and in fluid communication with, said tube;
another tube connected to, and in fluid communication with said cooler; and
another channel connected to, and in fluid communication with said other tube, proceeding near to the surface of the input shaft.

10. The improved transaxle as recited in claim 9, further comprising:
a transmission fluid pump on the front of the differential section;
a pinion carrier having a front end and a rear end;
a cup race for a tapered roller bearing near the front end of said pinion carrier;
a tapered roller bearing in said cup race;
one or more shims placed behind said cup race and adjacent to the front end of said pinion carrier;
another cup race for a tapered roller bearing near the rear end of said pinion carrier;
another tapered roller bearing, said other tapered roller bearing being in said cup race;
a side cover for a first side of the ring gear;
a race for holding a tapered roller bearing for the ring gear on the first side of the ring gear;
a tapered roller bearing for the ring gear located in said race;
one or more flat shims placed adjacent to said side cover behind said race;
another side cover, said other side cover being for the side of the ring gear opposite to the first side of the ring gear;
another race for holding a tapered roller bearing for the ring gear on the opposite side of the ring gear;
another tapered roller bearing, said other tapered roller bearing being located in said other race;
fasteners for connecting the differential section and the transmission section;
other fasteners for connecting a gear cover to the transmission section;
hollow dowels used with the fasteners and other fasteners; and
steel thread inserts used with the fasteners and other fasteners; and wherein:

the input shaft is constructed of billet 300M steel;

the intermediate shaft is constructed of billet 300M steel; and the forward drum is constructed of billet 300M steel.

11. The improved transaxle as recited in claim 8, wherein the output shaft comprises:

an upper output shaft attached to the planetary gears;

an upper drop-down gear connected to said upper output shaft;

a lower drop-down gear rotated by said upper drop-down gear, said lower drop-down gear being attached to the pinion shaft.

12. The improved transaxle as recited in claim 11, further comprising:

a bushing around the input shaft;

a channel on a first side of the bushing;

a tube connected to, and in fluid communication with, said channel;

a cooler attached to, and in fluid communication with, said tube;

another tube connected to, and in fluid communication with said cooler; and another channel connected to, and in fluid communication with said other tube, proceeding near to the surface of the input shaft.

13. The improved transaxle as recited in claim 12, further comprising:

a transmission fluid pump on the front of the differential section;

a pinion carrier having a front end and a rear end;

a cup race for a tapered roller bearing near the front end of said pinion carrier;

a tapered roller bearing in said cup race;

one or more shims placed behind said cup race and adjacent to the front end of said pinion carrier;

another cup race for a tapered roller bearing near the rear end of said pinion carrier;

another tapered roller bearing, said other tapered roller bearing being in said cup race;

a side cover for a first side of the ring gear;

a race for holding a tapered roller bearing for the ring gear on the first side of the ring gear;

a tapered roller bearing for the ring gear located in said race;

one or more flat shims placed adjacent to said side cover behind said race;

another side cover, said other side cover being for the side of the ring gear opposite to the first side of the ring gear;

another race for holding a tapered roller bearing for the ring gear on the opposite side of the ring gear;

another tapered roller bearing, said other tapered roller bearing being located in said other race;

an oil pump driven by the pinion gear; and a means for conveying oil from said oil pump to the pinion gear and the ring gear;

fasteners for connecting the differential section and the transmission section;

other fasteners for connecting a gear cover to the transmission section;

hollow dowels used with the fasteners and other fasteners; and steel thread inserts used with the fasteners and other fasteners; and wherein:

the input shaft is constructed of billet 300M steel;

the intermediate shaft is constructed of billet 300M steel; and the forward drum is constructed of billet 300M steel.

14. The improved transaxle as recited in claim 13, further comprising:

a means for spraying oil on said upper drop-down gear and on said lower drop-down gear.

15. The improved transaxle as recited in claim 8, wherein:

a bottom of a position on the forward drum that would have otherwise been occupied by a spline that has been eliminated is lowered.

16. The improved transaxle as recited in claim 15, further comprising:

a bushing around the input shaft;

a channel on a first side of the bushing;

a tube connected to, and in fluid communication with, said channel;

a cooler attached to, and in fluid communication with, said tube;

another tube connected to, and in fluid communication with said cooler; and another channel connected to, and in fluid communication with said other tube, proceeding near to the surface of the input shaft.

17. The improved transaxle as recited in claim 16, further comprising:

a transmission fluid pump on the front of the differential section;

a pinion carrier having a front end and a rear end;

a cup race for a tapered roller bearing near the front end of said pinion carrier;

a tapered roller bearing in said cup race;

one or more shims placed behind said cup race and adjacent to the front end of said pinion carrier;

another cup race for a tapered roller bearing near the rear end of said pinion carrier;

another tapered roller bearing, said other tapered roller bearing being in said cup race;

a side cover for a first side of the ring gear;

a race for holding a tapered roller bearing for the ring gear on the first side of the ring gear;

a tapered roller bearing for the ring gear located in said race;

one or more flat shims placed adjacent to said side cover behind said race;

another side cover, said other side cover being for the side of the ring gear opposite to the first side of the ring gear;

another race for holding a tapered roller bearing for the ring gear on the opposite side of the ring gear;

another tapered roller bearing, said other tapered roller bearing being located in said other race;

fasteners for connecting the differential section and the transmission section;

other fasteners for connecting a gear cover to the transmission section;

hollow dowels used with the fasteners and other fasteners; and steel thread inserts used with the fasteners and other fasteners; and wherein:

the input shaft is constructed of billet 300M steel;

the intermediate shaft is constructed of billet 300M steel; and the forward drum is constructed of billet 300M steel.

18. The improved transaxle as recited in claim 15, wherein the output shaft comprises:

an upper output shaft attached to the planetary gears;

an upper drop-down gear connected to said upper output shaft;

a lower drop-down gear rotated by said upper drop-down gear, said lower drop-down gear being attached to the pinion shaft.

19. The improved transaxle as recited in claim 18, further comprising:
   a bushing around the input shaft;
   a channel on a first side of the bushing;
   a tube connected to, and in fluid communication with, said channel;
   a cooler attached to, and in fluid communication with, said tube;
   another tube connected to, and in fluid communication with said cooler; and
   another channel connected to, and in fluid communication with said other tube, proceeding near to the surface of the input shaft.

20. The improved transaxle as recited in claim 19, further comprising:
   a transmission fluid pump on the front of the differential section;
   a pinion carrier having a front end and a rear end;
   a cup race for a tapered roller bearing near the front end of said pinion carrier;
   a tapered roller bearing in said cup race;
   one or more shims placed behind said cup race and adjacent to the front end of said pinion carrier;
   another cup race for a tapered roller bearing near the rear end of said pinion carrier;
   another tapered roller bearing, said other tapered roller bearing being in said cup race;
   a side cover for a first side of the ring gear;
   a race for holding a tapered roller bearing for the ring gear on the first side of the ring gear;
   a tapered roller bearing for the ring gear located in said race;
   one or more flat shims placed adjacent to said side cover behind said race;
   another side cover, said other side cover being for the side of the ring gear opposite to the first side of the ring gear;
   another race for holding a tapered roller bearing for the ring gear on the opposite side of the ring gear;
   another tapered roller bearing, said other tapered roller bearing being located in said other race;
   an oil pump driven by the pinion gear; and
   a means for conveying oil from said oil pump to the pinion gear and the ring gear;
   fasteners for connecting the differential section and the transmission section;
   other fasteners for connecting a gear cover to the transmission section;
   hollow dowels used with the fasteners and other fasteners; and
   steel thread inserts used with the fasteners and other fasteners; and wherein:
      the input shaft is constructed of billet 300M steel;
      the intermediate shaft is constructed of billet 300M steel; and
      the forward drum is constructed of billet 300M steel.

21. The improved transaxle as recited in claim 20, further comprising:
   a means for spraying oil on said upper drop-down gear and on said lower drop-down gear.

22. The improved transaxle as recited in claim 1, wherein:
   a bottom of a position on the forward drum that would have otherwise been occupied by a spline that has been eliminated is lowered.

23. The improved transaxle as recited in claim 22, further comprising:
   a bushing around the input shaft;
   a channel on a first side of the bushing;
   a tube connected to, and in fluid communication with, said channel;
   a cooler attached to, and in fluid communication with, said tube;
   another tube connected to, and in fluid communication with said cooler; and
   another channel connected to, and in fluid communication with said other tube, proceeding near to the surface of the input shaft.

24. The improved transaxle as recited in claim 23, further comprising:
   a transmission fluid pump on the front of the differential section;
   a pinion carrier having a front end and a rear end;
   a cup race for a tapered roller bearing near the front end of said pinion carrier;
   a tapered roller bearing in said cup race;
   one or more shims placed behind said cup race and adjacent to the front end of said pinion carrier;
   another cup race for a tapered roller bearing near the rear end of said pinion carrier;
   another tapered roller bearing, said other tapered roller bearing being in said cup race;
   a side cover for a first side of the ring gear;
   a race for holding a tapered roller bearing for the ring gear on the first side of the ring gear;
   a tapered roller bearing for the ring gear located in said race;
   one or more flat shims placed adjacent to said side cover behind said race;
   another side cover, said other side cover being for the side of the ring gear opposite to the first side of the ring gear;
   another race for holding a tapered roller bearing for the ring gear on the opposite side of the ring gear;
   another tapered roller bearing, said other tapered roller bearing being located in said other race;
   fasteners for connecting the differential section and the transmission section;
   other fasteners for connecting a gear cover to the transmission section;
   hollow dowels used with the fasteners and other fasteners; and
   steel thread inserts used with the fasteners and other fasteners; and wherein:
      the input shaft is constructed of billet 300M steel;
      the intermediate shaft is constructed of billet 300M steel; and
      the forward drum is constructed of billet 300M steel.

25. The improved transaxle as recited in claim 22, wherein the output shaft comprises:
   an upper output shaft attached to the planetary gears;
   an upper drop-down gear connected to said upper output shaft;
   a lower drop-down gear rotated by said upper drop-down gear, said lower drop-down gear being attached to the pinion shaft.

26. The improved transaxle as recited in claim 25, further comprising:
   a bushing around the input shaft;
   a channel on a first side of the bushing;
   a tube connected to, and in fluid communication with, said channel;

a cooler attached to, and in fluid communication with, said tube;
another tube connected to, and in fluid communication with said cooler; and
another channel connected to, and in fluid communication with said other tube, proceeding near to the surface of the input shaft.

27. The improved transaxle as recited in claim 26, further comprising:
a transmission fluid pump on the front of the differential section;
a pinion carrier having a front end and a rear end;
a cup race for a tapered roller bearing near the front end of said pinion carrier;
a tapered roller bearing in said cup race;
one or more shims placed behind said cup race and adjacent to the front end of said pinion carrier;
another cup race for a tapered roller bearing near the rear end of said pinion carrier;
another tapered roller bearing, said other tapered roller bearing being in said cup race;
a side cover for a first side of the ring gear;
a race for holding a tapered roller bearing for the ring gear on the first side of the ring gear;
a tapered roller bearing for the ring gear located in said race;
one or more flat shims placed adjacent to said side cover behind said race;
another side cover, said other side cover being for the side of the ring gear opposite to the first side of the ring gear;
another race for holding a tapered roller bearing for the ring gear on the opposite side of the ring gear;
another tapered roller bearing, said other tapered roller bearing being located in said other race;
an oil pump driven by the pinion gear; and
a means for conveying oil from said oil pump to the pinion gear and the ring gear;
fasteners for connecting the differential section and the transmission section;
other fasteners for connecting a gear cover to the transmission section;
hollow dowels used with the fasteners and other fasteners; and
steel thread inserts used with the fasteners and other fasteners; and wherein:
the input shaft is constructed of billet 300M steel;
the intermediate shaft is constructed of billet 300M steel; and
the forward drum is constructed of billet 300M steel.

28. The improved transaxle as recited in claim 27, further comprising:
a means for spraying oil on said upper drop-down gear and on said lower drop-down gear.

29. An improved transaxle of the type having a differential section with a front, a transmission section, an input shaft with a surface and with a transmission end having splines with sides, a forward drum having mating splines with sides and being splined to the input shaft, a forward hub in the forward drum, an intermediate shaft splined to the forward hub, planetary gears connected to the intermediate shaft, an output shaft attached to the planetary gears, a pinion shaft attached to the output shaft, a pinion gear connected to the pinion shaft, and a ring gear powered by the pinion shaft with such ring hear having a first side and an opposite side, wherein the improvement comprises:
the differential section having a space between the differential section and the input shaft;
the transmission section having a space between the transmission section and the input shaft;
the splines radiating outward from the transmission end of the input shaft beginning at the distance of the outer diameter of the remainder of the input shaft; and
at least one mating spline on the forward being narrowed on at least one side.

30. The improved transaxle as recited in claim 29, further comprising:
a bushing around the input shaft;
a channel on a first side of the bushing;
a tube connected to, and in fluid communication with, said channel;
a cooler attached to, and in fluid communication with, said tube;
another tube connected to, and in fluid communication with said cooler; and
another channel connected to, and in fluid communication with said other tube, proceeding near to the surface of the input shaft.

31. The improved transaxle as recited in claim 30, further comprising:
a transmission fluid pump on the front of the differential section;
a pinion carrier having a front end and a rear end;
a cup race for a tapered roller bearing near the front end of said pinion carrier;
a tapered roller bearing in said cup race;
one or more shims placed behind said cup race and adjacent to the front end of said pinion carrier;
another cup race for a tapered roller bearing near the rear end of said pinion carrier;
another tapered roller bearing, said other tapered roller bearing being in said cup race;
a side cover for a first side of the ring gear;
a race for holding a tapered roller bearing for the ring gear on the first side of the ring gear;
a tapered roller bearing for the ring gear located in said race;
one or more flat shims placed adjacent to said side cover behind said race;
another side cover, said other side cover being for the side of the ring gear opposite to the first side of the ring gear;
another race for holding a tapered roller bearing for the ring gear on the opposite side of the ring gear;
another tapered roller bearing, said other tapered roller bearing being located in said other race;
fasteners for connecting the differential section and the transmission section;
other fasteners for connecting a gear cover to the transmission section;
hollow dowels used with the fasteners and other fasteners; and
steel thread inserts used with the fasteners and other fasteners; and wherein:
the input shaft is constructed of billet 300M steel;
the intermediate shaft is constructed of billet 300M steel; and
the forward drum is constructed of billet 300M steel.

32. The improved transaxle as recited in claim 29, wherein the output shaft comprises:
an upper output shaft attached to the planetary gears;
an upper drop-down gear connected to said upper output shaft;
a lower drop-down gear rotated by said upper drop-down gear, said lower drop-down gear being attached to the pinion shaft.

33. The improved transaxle as recited in claim 32, further comprising:
a bushing around the input shaft;
a channel on a first side of the bushing;
a tube connected to, and in fluid communication with, said channel;
a cooler attached to, and in fluid communication with, said tube;
another tube connected to, and in fluid communication with said cooler; and
another channel connected to, and in fluid communication with said other tube, proceeding near to the surface of the input shaft.

34. The improved transaxle as recited in claim 33, further comprising:
a transmission fluid pump on the front of the differential section;
a pinion carrier having a front end and a rear end;
a cup race for a tapered roller bearing near the front end of said pinion carrier;
a tapered roller bearing in said cup race;
one or more shims placed behind said cup race and adjacent to the front end of said pinion carrier;
another cup race for a tapered roller bearing near the rear end of said pinion carrier;
another tapered roller bearing, said other tapered roller bearing being in said cup race;
a side cover for a first side of the ring gear;
a race for holding a tapered roller bearing for the ring gear on the first side of the ring gear;
a tapered roller bearing for the ring gear located in said race;
one or more flat shims placed adjacent to said side cover behind said race;
another side cover, said other side cover being for the side of the ring gear opposite to the first side of the ring gear;
another race for holding a tapered roller bearing for the ring gear on the opposite side of the ring gear;
another tapered roller bearing, said other tapered roller bearing being located in said other race;
an oil pump driven by the pinion gear; and
a means for conveying oil from said oil pump to the pinion gear and the ring gear;
fasteners for connecting the differential section and the transmission section;
other fasteners for connecting a gear cover to the transmission section;
hollow dowels used with the fasteners and other fasteners; and
steel thread inserts used with the fasteners and other fasteners; and wherein:
the input shaft is constructed of billet 300M steel;
the intermediate shaft is constructed of billet 300M steel; and
the forward drum is constructed of billet 300M steel.

35. The improved transaxle as recited in claim 34, further comprising:
a means for spraying oil on said upper drop-down gear and on said lower drop-down gear.

36. An improved transaxle of the type having a differential section with a front, a transmission section, an input shaft with a surface and with a transmission end having splines with sides, a forward drum having mating splines with sides and being splined to the input shaft, a forward hub in the forward drum, an intermediate shaft splined to the forward hub, planetary gears connected to the intermediate shaft, an output shaft attached to the planetary gears, a pinion shaft attached to the output shaft, a pinion gear connected to the pinion shaft, and a ring gear powered by the pinion shaft with such ring hear having a first side and an opposite side, wherein the improvement comprises:
the differential section having a space between the differential section and the input shaft;
the transmission section having a space between the transmission section and the input shaft;
the splines radiating outward from the transmission end of the input shaft beginning at the distance of the outer diameter of the remainder of the input shaft; and
a bottom of at least one position on the forward drum that is occupied by a spline being lowered.

37. The improved transaxle as recited in claim 36, further comprising:
a bushing around the input shaft;
a channel on a first side of the bushing;
a tube connected to, and in fluid communication with, said channel;
a cooler attached to, and in fluid communication with, said tube;
another tube connected to, and in fluid communication with said cooler; and
another channel connected to, and in fluid communication with said other tube, proceeding near to the surface of the input shaft.

38. The improved transaxle as recited in claim 37, further comprising:
a transmission fluid pump on the front of the differential section;
a pinion carrier having a front end and a rear end;
a cup race for a tapered roller bearing near the front end of said pinion carrier;
a tapered roller bearing in said cup race;
one or more shims placed behind said cup race and adjacent to the front end of said pinion carrier;
another cup race for a tapered roller bearing near the rear end of said pinion carrier;
another tapered roller bearing, said other tapered roller bearing being in said cup race;
a side cover for a first side of the ring gear;
a race for holding a tapered roller bearing for the ring gear on the first side of the ring gear;
a tapered roller bearing for the ring gear located in said race;
one or more flat shims placed adjacent to said side cover behind said race;
another side cover, said other side cover being for the side of the ring gear opposite to the first side of the ring gear;
another race for holding a tapered roller bearing for the ring gear on the opposite side of the ring gear;
another tapered roller bearing, said other tapered roller bearing being located in said other race;
fasteners for connecting the differential section and the transmission section;
other fasteners for connecting a gear cover to the transmission section;
hollow dowels used with the fasteners and other fasteners; and
steel thread inserts used with the fasteners and other fasteners; and wherein:
the input shaft is constructed of billet 300M steel;
the intermediate shaft is constructed of billet 300M steel; and
the forward drum is constructed of billet 300M steel.

39. The improved transaxle as recited in claim 36, wherein the output shaft comprises:

an upper output shaft attached to the planetary gears;
an upper drop-down gear connected to said upper output shaft;
a lower drop-down gear rotated by said upper drop-down gear, said lower drop-down gear being attached to the pinion shaft.

40. The improved transaxle as recited in claim 39, further comprising:
a bushing around the input shaft;
a channel on a first side of the bushing;
a tube connected to, and in fluid communication with, said channel;
a cooler attached to, and in fluid communication with, said tube;
another tube connected to, and in fluid communication with said cooler; and
another channel connected to, and in fluid communication with said other tube, proceeding near to the surface of the input shaft.

41. The improved transaxle as recited in claim 40, further comprising:
a transmission fluid pump on the front of the differential section;
a pinion carrier having a front end and a rear end;
a cup race for a tapered roller bearing near the front end of said pinion carrier;
a tapered roller bearing in said cup race;
one or more shims placed behind said cup race and adjacent to the front end of said pinion carrier;
another cup race for a tapered roller bearing near the rear end of said pinion carrier;
another tapered roller bearing, said other tapered roller bearing being in said cup race;
a side cover for a first side of the ring gear;
a race for holding a tapered roller bearing for the ring gear on the first side of the ring gear;
a tapered roller bearing for the ring gear located in said race;
one or more flat shims placed adjacent to said side cover behind said race;
another side cover, said other side cover being for the side of the ring gear opposite to the first side of the ring gear;
another race for holding a tapered roller bearing for the ring gear on the opposite side of the ring gear;
another tapered roller bearing, said other tapered roller bearing being located in said other race;
an oil pump driven by the pinion gear; and
a means for conveying oil from said oil pump to the pinion gear and the ring gear;
fasteners for connecting the differential section and the transmission section;
other fasteners for connecting a gear cover to the transmission section;
hollow dowels used with the fasteners and other fasteners; and
steel thread inserts used with the fasteners and other fasteners; and wherein:
the input shaft is constructed of billet 300M steel;
the intermediate shaft is constructed of billet 300M steel; and
the forward drum is constructed of billet 300M steel.

42. The improved transaxle as recited in claim 41, further comprising:
a means for spraying oil on said upper drop-down gear and on said lower drop-down gear.

43. An improved transaxle of the type having a differential section with a front, a transmission section, an input shaft with a surface and with a transmission end having splines with sides, a forward drum having mating splines with sides and being splined to the input shaft, a forward hub in the forward drum, an intermediate shaft splined to the forward hub, planetary gears connected to the intermediate shaft, an output shaft attached to the planetary gears, a pinion shaft attached to the output shaft, a pinion gear connected to the pinion shaft, and a ring gear powered by the pinion shaft with such ring hear having a first side and an opposite side, wherein the improvement comprises:
the differential section having a space between the differential section and the input shaft;
the transmission section having a space between the transmission section and the input shaft;
the splines radiating outward from the transmission end of the input shaft beginning at the distance of the outer diameter of the remainder of the input shaft; and
at least one position for a mating spline on the forward drum being left without a mating spline.

44. The improved transaxle as recited in claim 43, further comprising:
a bushing around the input shaft;
a channel on a first side of the bushing;
a tube connected to, and in fluid communication with, said channel;
a cooler attached to, and in fluid communication with, said tube;
another tube connected to, and in fluid communication with said cooler; and
another channel connected to, and in fluid communication with said other tube, proceeding near to the surface of the input shaft.

45. The improved transaxle as recited in claim 44, further comprising:
a transmission fluid pump on the front of the differential section;
a pinion carrier having a front end and a rear end;
a cup race for a tapered roller bearing near the front end of said pinion carrier;
a tapered roller bearing in said cup race;
one or more shims placed behind said cup race and adjacent to the front end of said pinion carrier;
another cup race for a tapered roller bearing near the rear end of said pinion carrier;
another tapered roller bearing, said other tapered roller bearing being in said cup race;
a side cover for a first side of the ring gear;
a race for holding a tapered roller bearing for the ring gear on the first side of the ring gear;
a tapered roller bearing for the ring gear located in said race;
one or more flat shims placed adjacent to said side cover behind said race;
another side cover, said other side cover being for the side of the ring gear opposite to the first side of the ring gear;
another race for holding a tapered roller bearing for the ring gear on the opposite side of the ring gear;
another tapered roller bearing, said other tapered roller bearing being located in said other race;
fasteners for connecting the differential section and the transmission section;
other fasteners for connecting a gear cover to the transmission section;
hollow dowels used with the fasteners and other fasteners; and
steel thread inserts used with the fasteners and other fasteners; and wherein:

the input shaft is constructed of billet 300M steel;
the intermediate shaft is constructed of billet 300M steel; and
the forward drum is constructed of billet 300M steel.

46. The improved transaxle as recited in claim 43, wherein the output shaft comprises:
an upper output shaft attached to the planetary gears;
an upper drop-down gear connected to said upper output shaft;
a lower drop-down gear rotated by said upper drop-down gear, said lower drop-down gear being attached to the pinion shaft.

47. The improved transaxle as recited in claim 46, further comprising:
a bushing around the input shaft;
a channel on a first side of the bushing;
a tube connected to, and in fluid communication with, said channel;
a cooler attached to, and in fluid communication with, said tube;
another tube connected to, and in fluid communication with said cooler; and
another channel connected to, and in fluid communication with said other tube, proceeding near to the surface of the input shaft.

48. The improved transaxle as recited in claim 47, further comprising:
a transmission fluid pump on the front of the differential section;
a pinion carrier having a front end and a rear end;
a cup race for a tapered roller bearing near the front end of said pinion carrier;
a tapered roller bearing in said cup race;
one or more shims placed behind said cup race and adjacent to the front end of said pinion carrier;
another cup race for a tapered roller bearing near the rear end of said pinion carrier;
another tapered roller bearing, said other tapered roller bearing being in said cup race;
a side cover for a first side of the ring gear;
a race for holding a tapered roller bearing for the ring gear on the first side of the ring gear;
a tapered roller bearing for the ring gear located in said race;
one or more flat shims placed adjacent to said side cover behind said race;
another side cover, said other side cover being for the side of the ring gear opposite to the first side of the ring gear;
another race for holding a tapered roller bearing for the ring gear on the opposite side of the ring gear;
another tapered roller bearing, said other tapered roller bearing being located in said other race;
an oil pump driven by the pinion gear; and
a means for conveying oil from said oil pump to the pinion gear and the ring gear;
fasteners for connecting the differential section and the transmission section;
other fasteners for connecting a gear cover to the transmission section;
hollow dowels used with the fasteners and other fasteners; and
steel thread inserts used with the fasteners and other fasteners; and wherein:
the input shaft is constructed of billet 300M steel;
the intermediate shaft is constructed of billet 300M steel; and
the forward drum is constructed of billet 300M steel.

49. The improved transaxle as recited in claim 48, further comprising:
a means for spraying oil on said upper drop-down gear and on said lower drop-down gear.

50. The improved transaxle as recited in claim 43, wherein:
each spline on the the transmission end of the input shaft adjacent to an empty position where a mating spline would otherwise have been is narrowed on a side adjacent to such empty position.

51. The improved transaxle as recited in claim 50, further comprising:
a bushing around the input shaft;
a channel on a first side of the bushing;
a tube connected to, and in fluid communication with, said channel;
a cooler attached to, and in fluid communication with, said tube;
another tube connected to, and in fluid communication with said cooler; and
another channel connected to, and in fluid communication with said other tube, proceeding near to the surface of the input shaft.

52. The improved transaxle as recited in claim 51, further comprising:
a transmission fluid pump on the front of the differential section;
a pinion carrier having a front end and a rear end;
a cup race for a tapered roller bearing near the front end of said pinion carrier;
a tapered roller bearing in said cup race;
one or more shims placed behind said cup race and adjacent to the front end of said pinion carrier;
another cup race for a tapered roller bearing near the rear end of said pinion carrier;
another tapered roller bearing, said other tapered roller bearing being in said cup race;
a side cover for a first side of the ring gear;
a race for holding a tapered roller bearing for the ring gear on the first side of the ring gear;
a tapered roller bearing for the ring gear located in said race;
one or more flat shims placed adjacent to said side cover behind said race;
another side cover, said other side cover being for the side of the ring gear opposite to the first side of the ring gear;
another race for holding a tapered roller bearing for the ring gear on the opposite side of the ring gear;
another tapered roller bearing, said other tapered roller bearing being located in said other race;
fasteners for connecting the differential section and the transmission section;
other fasteners for connecting a gear cover to the transmission section;
hollow dowels used with the fasteners and other fasteners; and
steel thread inserts used with the fasteners and other fasteners; and wherein:
the input shaft is constructed of billet 300M steel;
the intermediate shaft is constructed of billet 300M steel; and
the forward drum is constructed of billet 300M steel.

53. The improved transaxle as recited in claim 50, wherein the output shaft comprises:
an upper output shaft attached to the planetary gears;
an upper drop-down gear connected to said upper output shaft;

a lower drop-down gear rotated by said upper drop-down gear, said lower drop-down gear being attached to the pinion shaft.

54. The improved transaxle as recited in claim 53, further comprising:
a bushing around the input shaft;
a channel on a first side of the bushing;
a tube connected to, and in fluid communication with, said channel;
a cooler attached to, and in fluid communication with, said tube;
another tube connected to, and in fluid communication with said cooler; and
another channel connected to, and in fluid communication with said other tube, proceeding near to the surface of the input shaft.

55. The improved transaxle as recited in claim 54, further comprising:
a transmission fluid pump on the front of the differential section;
a pinion carrier having a front end and a rear end;
a cup race for a tapered roller bearing near the front end of said pinion carrier;
a tapered roller bearing in said cup race;
one or more shims placed behind said cup race and adjacent to the front end of said pinion carrier;
another cup race for a tapered roller bearing near the rear end of said pinion carrier;
another tapered roller bearing, said other tapered roller bearing being in said cup race;
a side cover for a first side of the ring gear;
a race for holding a tapered roller bearing for the ring gear on the first side of the ring gear;
a tapered roller bearing for the ring gear located in said race;
one or more flat shims placed adjacent to said side cover behind said race;
another side cover, said other side cover being for the side of the ring gear opposite to the first side of the ring gear;
another race for holding a tapered roller bearing for the ring gear on the opposite side of the ring gear;
another tapered roller bearing, said other tapered roller bearing being located in said other race;
an oil pump driven by the pinion gear; and
a means for conveying oil from said oil pump to the pinion gear and the ring gear;
fasteners for connecting the differential section and the transmission section;
other fasteners for connecting a gear cover to the transmission section;
hollow dowels used with the fasteners and other fasteners; and
steel thread inserts used with the fasteners and other fasteners; and wherein:
the input shaft is constructed of billet 300M steel;
the intermediate shaft is constructed of billet 300M steel; and
the forward drum is constructed of billet 300M steel.

56. The improved transaxle as recited in claim 55, further comprising:
a means for spraying oil on said upper drop-down gear and on said lower drop-down gear.

57. The improved transaxle as recited in claim 43, wherein:
at least one position for a spline on the transmission end of the input shaft is left without a spline.

58. The improved transaxle as recited in claim 57, further comprising:
a bushing around the input shaft;
a channel on a first side of the bushing;
a tube connected to, and in fluid communication with, said channel;
a cooler attached to, and in fluid communication with, said tube;
another tube connected to, and in fluid communication with said cooler; and
another channel connected to, and in fluid communication with said other tube, proceeding near to the surface of the input shaft.

59. The improved transaxle as recited in claim 58, further comprising:
a transmission fluid pump on the front of the differential section;
a pinion carrier having a front end and a rear end;
a cup race for a tapered roller bearing near the front end of said pinion carrier;
a tapered roller bearing in said cup race;
one or more shims placed behind said cup race and adjacent to the front end of said pinion carrier;
another cup race for a tapered roller bearing near the rear end of said pinion carrier;
another tapered roller bearing, said other tapered roller bearing being in said cup race;
a side cover for a first side of the ring gear;
a race for holding a tapered roller bearing for the ring gear on the first side of the ring gear;
a tapered roller bearing for the ring gear located in said race;
one or more flat shims placed adjacent to said side cover behind said race;
another side cover, said other side cover being for the side of the ring gear opposite to the first side of the ring gear;
another race for holding a tapered roller bearing for the ring gear on the opposite side of the ring gear;
another tapered roller bearing, said other tapered roller bearing being located in said other race;
fasteners for connecting the differential section and the transmission section;
other fasteners for connecting a gear cover to the transmission section;
hollow dowels used with the fasteners and other fasteners; and
steel thread inserts used with the fasteners and other fasteners; and wherein:
the input shaft is constructed of billet 300M steel;
the intermediate shaft is constructed of billet 300M steel; and
the forward drum is constructed of billet 300M steel.

60. The improved transaxle as recited in claim 57, wherein the output shaft comprises:
an upper output shaft attached to the planetary gears;
an upper drop-down gear connected to said upper output shaft;
a lower drop-down gear rotated by said upper drop-down gear, said lower drop-down gear being attached to the pinion shaft.

61. The improved transaxle as recited in claim 60, further comprising:
a bushing around the input shaft;
a channel on a first side of the bushing;
a tube connected to, and in fluid communication with, said channel;

a cooler attached to, and in fluid communication with, said tube;
  another tube connected to, and in fluid communication with said cooler; and
  another channel connected to, and in fluid communication with said other tube, proceeding near to the surface of the input shaft.

62. The improved transaxle as recited in claim 61, further comprising:
  a transmission fluid pump on the front of the differential section;
  a pinion carrier having a front end and a rear end;
  a cup race for a tapered roller bearing near the front end of said pinion carrier;
  a tapered roller bearing in said cup race;
  one or more shims placed behind said cup race and adjacent to the front end of said pinion carrier;
  another cup race for a tapered roller bearing near the rear end of said pinion carrier;
  another tapered roller bearing, said other tapered roller bearing being in said cup race;
  a side cover for a first side of the ring gear;
  a race for holding a tapered roller bearing for the ring gear on the first side of the ring gear;
  a tapered roller bearing for the ring gear located in said race;
  one or more flat shims placed adjacent to said side cover behind said race;
  another side cover, said other side cover being for the side of the ring gear opposite to the first side of the ring gear;
  another race for holding a tapered roller bearing for the ring gear on the opposite side of the ring gear;
  another tapered roller bearing, said other tapered roller bearing being located in said other race;
  an oil pump driven by the pinion gear; and
  a means for conveying oil from said oil pump to the pinion gear and the ring gear;
  fasteners for connecting the differential section and the transmission section;
  other fasteners for connecting a gear cover to the transmission section;
  hollow dowels used with the fasteners and other fasteners; and
  steel thread inserts used with the fasteners and other fasteners; and wherein:
    the input shaft is constructed of billet 300M steel;
    the intermediate shaft is constructed of billet 300M steel; and
    the forward drum is constructed of billet 300M steel.

63. The improved transaxle as recited in claim 62, further comprising:
  a means for spraying oil on said upper drop-down gear and on said lower drop-down gear.

64. An improved transaxle of the type having a differential section with a front, a transmission section, an input shaft with a surface and with a transmission end having splines with sides, a forward drum having mating splines with sides and being splined to the input shaft, a forward hub in the forward drum, an intermediate shaft splined to the forward hub, planetary gears connected to the intermediate shaft, an output shaft attached to the planetary gears, a pinion shaft attached to the output shaft, a pinion gear connected to the pinion shaft, and a ring gear powered by the pinion shaft with such ring hear having a first side and an opposite side, wherein the improvement comprises:
  the differential section having a space between the differential section and the input shaft;
  the transmission section having a space between the transmission section and the input shaft;
  the splines radiating outward from the transmission end of the input shaft beginning at the distance of the outer diameter of the remainder of the input shaft; and
  at least one spline on the transmission end of the input shaft being narrowed on at least one side.

65. The improved transaxle as recited in claim 64, further comprising:
  a bushing around the input shaft;
  a channel on a first side of the bushing;
  a tube connected to, and in fluid communication with, said channel;
  a cooler attached to, and in fluid communication with, said tube;
  another tube connected to, and in fluid communication with said cooler; and
  another channel connected to, and in fluid communication with said other tube, proceeding near to the surface of the input shaft.

66. The improved transaxle as recited in claim 65, further comprising:
  a transmission fluid pump on the front of the differential section;
  a pinion carrier having a front end and a rear end;
  a cup race for a tapered roller bearing near the front end of said pinion carrier;
  a tapered roller bearing in said cup race;
  one or more shims placed behind said cup race and adjacent to the front end of said pinion carrier;
  another cup race for a tapered roller bearing near the rear end of said pinion carrier;
  another tapered roller bearing, said other tapered roller bearing being in said cup race;
  a side cover for a first side of the ring gear;
  a race for holding a tapered roller bearing for the ring gear on the first side of the ring gear;
  a tapered roller bearing for the ring gear located in said race;
  one or more flat shims placed adjacent to said side cover behind said race;
  another side cover, said other side cover being for the side of the ring gear opposite to the first side of the ring gear;
  another race for holding a tapered roller bearing for the ring gear on the opposite side of the ring gear;
  another tapered roller bearing, said other tapered roller bearing being located in said other race;
  fasteners for connecting the differential section and the transmission section;
  other fasteners for connecting a gear cover to the transmission section;
  hollow dowels used with the fasteners and other fasteners; and
  steel thread inserts used with the fasteners and other fasteners; and wherein:
    the input shaft is constructed of billet 300M steel;
    the intermediate shaft is constructed of billet 300M steel; and
    the forward drum is constructed of billet 300M steel.

67. The improved transaxle as recited in claim 64, wherein the output shaft comprises:
  an upper output shaft attached to the planetary gears;
  an upper drop-down gear connected to said upper output shaft;
  a lower drop-down gear rotated by said upper drop-down gear, said lower drop-down gear being attached to the pinion shaft.

68. The improved transaxle as recited in claim 67, further comprising:
- a bushing around the input shaft;
- a channel on a first side of the bushing;
- a tube connected to, and in fluid communication with, said channel;
- a cooler attached to, and in fluid communication with, said tube;
- another tube connected to, and in fluid communication with said cooler; and
- another channel connected to, and in fluid communication with said other tube, proceeding near to the surface of the input shaft.

69. The improved transaxle as recited in claim 68, further comprising:
- a transmission fluid pump on the front of the differential section;
- a pinion carrier having a front end and a rear end;
- a cup race for a tapered roller bearing near the front end of said pinion carrier;
- a tapered roller bearing in said cup race;
- one or more shims placed behind said cup race and adjacent to the front end of said pinion carrier;
- another cup race for a tapered roller bearing near the rear end of said pinion carrier;
- another tapered roller bearing, said other tapered roller bearing being in said cup race;
- a side cover for a first side of the ring gear;
- a race for holding a tapered roller bearing for the ring gear on the first side of the ring gear;
- a tapered roller bearing for the ring gear located in said race;
- one or more flat shims placed adjacent to said side cover behind said race;
- another side cover, said other side cover being for the side of the ring gear opposite to the first side of the ring gear;
- another race for holding a tapered roller bearing for the ring gear on the opposite side of the ring gear;
- another tapered roller bearing, said other tapered roller bearing being located in said other race;
- an oil pump driven by the pinion gear; and
- a means for conveying oil from said oil pump to the pinion gear and the ring gear;
- fasteners for connecting the differential section and the transmission section;
- other fasteners for connecting a gear cover to the transmission section;
- hollow dowels used with the fasteners and other fasteners; and
- steel thread inserts used with the fasteners and other fasteners; and wherein:
  - the input shaft is constructed of billet 300M steel;
  - the intermediate shaft is constructed of billet 300M steel; and
  - the forward drum is constructed of billet 300M steel.

70. The improved transaxle as recited in claim 69, further comprising:
- a means for spraying oil on said upper drop-down gear and on said lower drop-down gear.

71. An improved transaxle of the type having a differential section with a front, a transmission section, an input shaft with a surface and with a transmission end having splines with sides, a forward drum having mating splines with sides and being splined to the input shaft, a forward hub in the forward drum, an intermediate shaft splined to the forward hub, planetary gears connected to the intermediate shaft, an output shaft attached to the planetary gears, a pinion shaft attached to the output shaft, a pinion gear connected to the pinion shaft, and a ring gear powered by the pinion shaft with such ring hear having a first side and an opposite side, wherein the improvement comprises:
- the differential section having a space between the differential section and the input shaft;
- the transmission section having a space between the transmission section and the input shaft;
- the splines radiating outward from the transmission end of the input shaft beginning at the distance of the outer diameter of the remainder of the input shaft; and
- at least one position for a spline on the transmission end of the input shaft being left without a spline;
- a bushing around the input shaft;
- a channel on a first side of the bushing;
- a tube connected to, and in fluid communication with, said channel;
- a cooler attached to, and in fluid communication with, said tube;
- another tube connected to, and in fluid communication with said cooler;
- another channel connected to, and in fluid communication with said other tube, proceeding near to the surface of the input shaft;
- a transmission fluid pump on the front of the differential section;
- a pinion carrier having a front end and a rear end;
- a cup race for a tapered roller bearing near the front end of said pinion carrier;
- a tapered roller bearing in said cup race;
- one or more shims placed behind said cup race and adjacent to the front end of said pinion carrier;
- another cup race for a tapered roller bearing near the rear end of said pinion carrier;
- another tapered roller bearing, said other tapered roller bearing being in said cup race;
- a side cover for a first side of the ring gear;
- a race for holding a tapered roller bearing for the ring gear on the first side of the ring gear;
- a tapered roller bearing for the ring gear located in said race;
- one or more flat shims placed adjacent to said side cover behind said race;
- another side cover, said other side cover being for the side of the ring gear opposite to the first side of the ring gear;
- another race for holding a tapered roller bearing for the ring gear on the opposite side of the ring gear;
- another tapered roller bearing, said other tapered roller bearing being located in said other race;
- an oil pump driven by the pinion gear; and
- a means for conveying oil from said oil pump to the pinion gear and the ring gear;
- fasteners for connecting the differential section and the transmission section;
- other fasteners for connecting a gear cover to the transmission section;
- hollow dowels used with the fasteners and other fasteners; and
- steel thread inserts used with the fasteners and other fasteners; and wherein:
  - the input shaft is constructed of billet 300M steel;
  - the intermediate shaft is constructed of billet 300M steel;
  - the forward drum is constructed of billet 300M steel; and
  - the output shaft comprises:
    - an upper output shaft attached to the planetary gears;

an upper drop-down gear connected to said upper output shaft; and a lower drop-down gear rotated by said upper drop-down gear, said lower drop-down gear being attached to the pinion shaft; and the improved transaxle further comprising:

a means for spraying oil on said upper drop-down gear and on said lower drop-down gear; and wherein:

each mating spline on the forward drum adjacent to an empty position where a spline would otherwise have been is narrowed on a side adjacent to such empty position; and a bottom of a position on the forward drum that would have otherwise been occupied by a spline that has been eliminated is lowered.

72. An improved transaxle of the type having a differential section with a front, a transmission section, an input shaft with a surface and with a transmission end having splines with sides, a forward drum having mating splines with sides and being splined to the input shaft, a forward hub in the forward drum, an intermediate shaft splined to the forward hub, planetary gears connected to the intermediate shaft, an output shaft attached to the planetary gears, a pinion shaft attached to the output shaft, a pinion gear connected to the pinion shaft, and a ring gear powered by the pinion shaft with such ring hear having a first side and an opposite side, wherein the improvement comprises:

the differential section having a space between the differential section and the input shaft;

the transmission section having a space between the transmission section and the input shaft;

the splines radiating outward from the transmission end of the input shaft beginning at the distance of the outer diameter of the remainder of the input shaft;

at least one position for a mating spline on the forward drum being left without a mating spline;

a bushing around the input shaft;

a channel on a first side of the bushing;

a tube connected to, and in fluid communication with, said channel;

a cooler attached to, and in fluid communication with, said tube;

another tube connected to, and in fluid communication with said cooler;

another channel connected to, and in fluid communication with said other tube, proceeding near to the surface of the input shaft;

a transmission fluid pump on the front of the differential section;

a pinion carrier having a front end and a rear end;

a cup race for a tapered roller bearing near the front end of said pinion carrier;

a tapered roller bearing in said cup race;

one or more shims placed behind said cup race and adjacent to the front end of said pinion carrier;

another cup race for a tapered roller bearing near the rear end of said pinion carrier;

another tapered roller bearing, said other tapered roller bearing being in said cup race;

a side cover for a first side of the ring gear;

a race for holding a tapered roller bearing for the ring gear on the first side of the ring gear;

a tapered roller bearing for the ring gear located in said race;

one or more flat shims placed adjacent to said side cover behind said race;

another side cover, said other side cover being for the side of the ring gear opposite to the first side of the ring gear;

another race for holding a tapered roller bearing for the ring gear on the opposite side of the ring gear;

another tapered roller bearing, said other tapered roller bearing being located in said other race;

an oil pump driven by the pinion gear; and a means for conveying oil from said oil pump to the pinion gear and the ring gear;

fasteners for connecting the differential section and the transmission section;

other fasteners for connecting a gear cover to the transmission section;

hollow dowels used with the fasteners and other fasteners; and steel thread inserts used with the fasteners and other fasteners; and wherein:

the input shaft is constructed of billet 300M steel;

the intermediate shaft is constructed of billet 300M steel;

the forward drum is constructed of billet 300M steel; and the output shaft comprises:

an upper output shaft attached to the planetary gears;

an upper drop-down gear connected to said upper output shaft; and a lower drop-down gear rotated by said upper drop-down gear, said lower drop-down gear being attached to the pinion shaft; and the improved transaxle further comprising:

a means for spraying oil on said upper drop-down gear and on said lower drop-down gear; and wherein:

each spline on the the transmission end of the input shaft adjacent to an empty position where a mating spline would otherwise have been is narrowed on a side adjacent to such empty position.

73. An improved transaxle of the type having a differential section with a front, a transmission section, an input shaft with a surface and with a transmission end having splines with sides, a forward drum having mating splines with sides and being splined to the input shaft, a forward hub in the forward drum, an intermediate shaft splined to the forward hub, planetary gears connected to the intermediate shaft, an output shaft attached to the planetary gears, a pinion shaft attached to the output shaft, a pinion gear connected to the pinion shaft, and a ring gear powered by the pinion shaft with such ring hear having a first side and an opposite side, wherein the improvement comprises:

the differential section having a space between the differential section and the input shaft;

the transmission section having a space between the transmission section and the input shaft;

the splines radiating outward from the transmission end of the input shaft beginning at the distance of the outer diameter of the remainder of the input shaft;

at least one position for a mating spline on the forward drum being left without a mating spline; and at least one position for a spline on the transmission end of the input shaft being left without a spline;

a bushing around the input shaft;

a channel on a first side of the bushing;

a tube connected to, and in fluid communication with, said channel;

a cooler attached to, and in fluid communication with, said tube;

another tube connected to, and in fluid communication with said cooler;

another channel connected to, and in fluid communication with said other tube, proceeding near to the surface of the input shaft;
a transmission fluid pump on the front of the differential section;
a pinion carrier having a front end and a rear end;
a cup race for a tapered roller bearing near the front end of said pinion carrier;
a tapered roller bearing in said cup race;
one or more shims placed behind said cup race and adjacent to the front end of said pinion carrier;
another cup race for a tapered roller bearing near the rear end of said pinion carrier;
another tapered roller bearing, said other tapered roller bearing being in said cup race;
a side cover for a first side of the ring gear;
a race for holding a tapered roller bearing for the ring gear on the first side of the ring gear;
a tapered roller bearing for the ring gear located in said race;
one or more flat shims placed adjacent to said side cover behind said race;
another side cover, said other side cover being for the side of the ring gear opposite to the first side of the ring gear;
another race for holding a tapered roller bearing for the ring gear on the opposite side of the ring gear;
another tapered roller bearing, said other tapered roller bearing being located in said other race;
an oil pump driven by the pinion gear; and
a means for conveying oil from said oil pump to the pinion gear and the ring gear;
fasteners for connecting the differential section and the transmission section;
other fasteners for connecting a gear cover to the transmission section;
hollow dowels used with the fasteners and other fasteners; and
steel thread inserts used with the fasteners and other fasteners; and wherein:
 the input shaft is constructed of billet 300M steel;
 the intermediate shaft is constructed of billet 300M steel;
 the forward drum is constructed of billet 300M steel; and
 the output shaft comprises:
  an upper output shaft attached to the planetary gears;
  an upper drop-down gear connected to said upper output shaft; and
  a lower drop-down gear rotated by said upper drop-down gear, said lower drop-down gear being attached to the pinion shaft; and the improved transaxle further comprising:
a means for spraying oil on said upper drop-down gear and on said lower drop-down gear.

* * * * *